US010070751B2

(12) United States Patent
Magniet et al.

(10) Patent No.: US 10,070,751 B2
(45) Date of Patent: Sep. 11, 2018

(54) CAPSULE, BEVERAGE PRODUCTION MACHINE AND SYSTEM FOR THE PREPARATION OF A NUTRITIONAL PRODUCT

(71) Applicant: NESTEC S.A., Vevey (CH)

(72) Inventors: Ines Magniet, Savigny (CH); Yann Epars, Penthalaz (CH); Vincent Martin, Crissier (CH); Heinz Wyss, Oberdiessbach (CH); Raphael Bernhardsgruetter, St. Gallen (CH); Roland Lehmann, Gossau (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/288,428

(22) Filed: Oct. 7, 2016

(65) Prior Publication Data
US 2017/0020328 A1 Jan. 26, 2017

Related U.S. Application Data

(62) Division of application No. 13/884,878, filed as application No. PCT/EP2011/069814 on Nov. 10, 2011, now Pat. No. 9,499,333.

(30) Foreign Application Priority Data

Nov. 11, 2010 (EP) ..................................... 10190899
Apr. 29, 2011 (EP) ..................................... 11164349

(51) Int. Cl.
*A47J 31/44* (2006.01)
*A47J 31/06* (2006.01)
(Continued)

(52) U.S. Cl.
CPC ....... *A47J 31/4492* (2013.01); *A47J 31/0642* (2013.01); *A47J 31/369* (2013.01);
(Continued)

(58) Field of Classification Search
CPC .... A47J 31/369; A47J 31/407; A47J 31/0642; A47J 31/4492; B65D 85/804; B65D 85/8043
(Continued)

(56) References Cited

U.S. PATENT DOCUMENTS 2,243,895 A * 6/1941 Brown ................. A47J 31/3633
99/289 R
2,715,868 A * 8/1955 Brown ..................... A47J 31/36
426/433
(Continued)

FOREIGN PATENT DOCUMENTS

EP 1974638 10/2008
EP 2236437 10/2010
(Continued)

OTHER PUBLICATIONS

Australian Office Action for Application No. 2011328110, dated Apr. 21, 2016, 3 pages.

*Primary Examiner* — Eric Stapleton
(74) *Attorney, Agent, or Firm* — K&L Gates LLP

(57) ABSTRACT

A capsule has an inlet face C formed by a circular section and a bulge section extending from the circular section so that the inlet face C is not symmetric in rotation. The capsule further has an optically readable code on a side wall of a cup-shaped body of the capsule opposite the bulge section. A beverage production machine has a capsule holder for holding the capsule in the beverage production machine so that the optically readable code can be read by a code reader. Liquid can be supplied to the capsule to produce a nutritional product. The optically readable code and the code reader can be prevented from being contaminated with liquid, vapor, dirt or the like. The beverage production machine can
(Continued)

perform an automatic detection of the capsule type and a corresponding automatic setting of preparation parameters.

8 Claims, 10 Drawing Sheets

(51) Int. Cl.
    *A47J 31/40*           (2006.01)
    *B65D 85/804*         (2006.01)
    *A47J 31/36*           (2006.01)

(52) U.S. Cl.
    CPC .......... *A47J 31/407* (2013.01); *B65D 85/804* (2013.01); *B65D 85/8043* (2013.01)

(58) Field of Classification Search
    USPC .......................................................... 99/275
    See application file for complete search history.

(56) References Cited

U.S. PATENT DOCUMENTS

| | | | | |
|---|---|---|---|---|
| 2,879,659 A * | 3/1959 | Jacobi | ...................... | E05B 27/00 70/493 |
| 2,899,106 A * | 8/1959 | Weinert | ............... | A62C 13/006 118/308 |
| 2,939,380 A * | 6/1960 | Parraga | ............... | A47J 31/3657 194/242 |
| 2,983,443 A * | 5/1961 | Robinson et al. | ........ | G07C 1/14 234/112 |
| 3,031,947 A * | 5/1962 | Heuckeroth | ............ | A47J 31/04 99/283 |
| 3,046,869 A * | 7/1962 | Reynolds | ............... | A47J 31/408 210/387 |
| 3,129,294 A * | 4/1964 | Henatsch | ............... | H04M 1/278 101/96 |
| 3,292,527 A * | 12/1966 | Stasse | ................. | A47J 31/0673 222/541.3 |
| 3,295,998 A * | 1/1967 | Goros | ................. | A47J 31/3633 221/124 |
| 3,336,857 A * | 8/1967 | Knodt | ..................... | A47J 31/16 99/295 |
| 3,356,011 A * | 12/1967 | Parraga | ............... | A47J 31/3614 99/287 |
| 3,403,617 A * | 10/1968 | Lampe | .................. | A47J 31/005 222/86 |
| 3,478,669 A * | 11/1969 | Lanes | .................. | C12G 1/0216 99/276 |
| 3,500,742 A * | 3/1970 | Tanguy | ................... | A23L 3/005 219/518 |
| 3,607,297 A * | 9/1971 | Fasano | ............... | B65D 85/8043 426/431 |
| 3,662,706 A * | 5/1972 | Soini | ......................... | G09F 3/00 209/528 |
| 3,664,231 A * | 5/1972 | Hanson | ................... | E05B 37/16 70/182 |
| 3,695,314 A * | 10/1972 | Watts | .................... | B67D 1/0051 141/361 |
| 3,802,606 A * | 4/1974 | Gust | ..................... | B67D 3/0003 222/185.1 |
| 3,805,999 A * | 4/1974 | Syverson | ................ | G07F 15/12 222/129.4 |
| 3,971,305 A * | 7/1976 | Daswick | ................. | A47J 31/02 210/474 |
| 4,204,966 A * | 5/1980 | Morgan, Jr. | ........... | B01D 29/23 210/232 |
| D255,529 S * | 6/1980 | Dziekonski | ............. | G07F 15/12 D7/309 |
| 4,206,694 A * | 6/1980 | Moskowitz | ......... | A47J 31/0647 99/295 |
| 4,253,385 A * | 3/1981 | Illy | ..................... | A47J 31/3685 99/281 |
| 4,375,586 A * | 3/1983 | Ueda | ......................... | F24C 7/08 219/702 |
| 4,382,402 A * | 5/1983 | Alvarez | ................ | A47J 31/005 219/202 |
| 4,389,191 A * | 6/1983 | Lowe | ..................... | F27B 14/08 110/177 |
| 4,452,130 A * | 6/1984 | Klein | .................... | A47J 31/005 99/307 |
| 4,484,515 A * | 11/1984 | Illy | ..................... | A47J 31/3647 222/54 |
| 4,551,611 A * | 11/1985 | Longo | .................... | A47J 31/56 219/506 |
| 4,649,810 A * | 3/1987 | Wong | ..................... | A47J 27/14 222/501 |
| 4,651,877 A * | 3/1987 | Adrianus de Mooy | ...................... | B65D 33/004 206/459.5 |
| 4,653,390 A * | 3/1987 | Hayes | ................... | A47J 31/057 392/442 |
| 4,724,752 A * | 2/1988 | Aliesch | ............... | A47J 31/3628 99/289 R |
| 4,738,378 A * | 4/1988 | Oakley | ................... | A47J 31/10 222/165 |
| 4,744,291 A * | 5/1988 | Wallin | .................. | A47J 31/545 99/280 |
| 4,771,165 A * | 9/1988 | van Hulzen | ..... | G06K 19/06159 235/454 |
| 4,775,048 A * | 10/1988 | Baecchi | ............... | A47J 31/407 206/0.5 |
| 4,787,299 A * | 11/1988 | Levi | ..................... | A47J 31/0657 99/285 |
| 4,829,889 A * | 5/1989 | Takeuchi | ............ | A47J 31/0668 99/285 |
| 4,838,152 A * | 6/1989 | Kubicko | ............ | A47J 31/0573 392/465 |
| 4,846,052 A * | 7/1989 | Favre | ................... | A47J 31/3695 99/295 |
| 4,853,234 A * | 8/1989 | Bentley | ............ | B65D 85/8043 206/0.5 |
| 4,858,523 A * | 8/1989 | Helbling | ............ | A47J 31/007 99/280 |
| 4,860,645 A * | 8/1989 | van der Lijn | ...... | B65D 85/8043 210/482 |
| 4,873,915 A * | 10/1989 | Newman | ............. | A47J 31/3628 99/289 R |
| 4,875,408 A * | 10/1989 | McGee | .................. | A47J 31/057 426/433 |
| 4,876,953 A * | 10/1989 | Imamura | ............. | A47J 31/047 99/280 |
| 4,917,005 A * | 4/1990 | Knepler | ................ | A47J 31/057 392/451 |
| 4,920,252 A * | 4/1990 | Yoshino | ............ | G05D 23/1934 219/485 |
| 4,921,712 A * | 5/1990 | Malmquist | ............ | A47J 31/057 426/110 |
| 4,963,939 A * | 10/1990 | Kurando | ............ | G03G 15/0855 335/203 |
| 4,967,648 A * | 11/1990 | Helbling | ............. | A47J 31/007 99/280 |
| 4,983,410 A * | 1/1991 | Dinos | ................ | B65D 85/8043 426/110 |
| 4,990,352 A * | 2/1991 | Newman | ............. | A47J 31/3628 426/392 |
| 5,011,042 A * | 4/1991 | Bunce | ...................... | G07F 9/105 219/700 |
| D320,529 S * | 10/1991 | Newman | ............. | A47J 31/057 D7/399 |
| D320,530 S * | 10/1991 | Newman | ............. | A47J 31/057 D7/399 |
| 5,072,660 A * | 12/1991 | Helbling | ............. | A47J 31/007 426/112 |
| 5,158,793 A * | 10/1992 | Helbling | ............. | A47J 31/007 426/231 |
| 5,375,508 A * | 12/1994 | Knepler | ............... | A47J 31/0576 219/483 |
| 5,463,934 A * | 11/1995 | Locati | ................. | A47J 31/3614 99/286 |

(56) References Cited

U.S. PATENT DOCUMENTS

| | | | | |
|---|---|---|---|---|
| 5,495,793 | A * | 3/1996 | Muis | A47J 31/34 99/280 |
| 5,520,093 | A * | 5/1996 | Ackermann | A47J 31/3657 99/289 T |
| 5,531,604 | A * | 7/1996 | Huang | H01R 12/716 439/752 |
| 5,547,470 | A * | 8/1996 | Johnson | A61M 5/16827 128/DIG. 12 |
| 5,551,988 | A * | 9/1996 | Reyhanloo | A47J 31/60 134/166 R |
| 5,562,353 | A * | 10/1996 | Handa | G06F 17/214 400/61 |
| 5,568,763 | A * | 10/1996 | Kunzler | A47J 31/40 426/433 |
| 5,694,115 | A * | 12/1997 | Desatoff | A47J 31/44 307/140 |
| 5,718,163 | A * | 2/1998 | Termini | A47J 42/44 241/34 |
| 5,798,037 | A * | 8/1998 | Peacock | B01D 35/143 106/635 |
| 5,840,189 | A * | 11/1998 | Sylvan | B65D 85/8043 210/233 |
| 5,853,599 | A * | 12/1998 | Hsu | B01D 17/085 210/100 |
| 5,865,991 | A * | 2/1999 | Hsu | C02F 1/008 210/100 |
| 5,934,885 | A * | 8/1999 | Farrell | F04B 43/06 417/250 |
| 5,961,923 | A * | 10/1999 | Nova | B01J 19/0046 422/527 |
| 5,974,950 | A * | 11/1999 | King | A47J 31/3633 99/289 R |
| 6,009,792 | A * | 1/2000 | Kraan | A47J 31/0668 99/295 |
| 6,017,496 | A * | 1/2000 | Nova | B01J 19/0046 422/107 |
| 6,021,705 | A * | 2/2000 | Dijs | A47J 31/0678 99/295 |
| 6,026,732 | A * | 2/2000 | Kollep | A47J 31/0668 99/295 |
| 6,032,571 | A * | 3/2000 | Brous | C12C 13/10 366/249 |
| 6,035,762 | A * | 3/2000 | Ruckstuhl | A47J 31/3623 99/289 R |
| 6,079,315 | A * | 6/2000 | Beaulieu | A47J 31/3628 99/289 R |
| 6,117,471 | A * | 9/2000 | King | A47J 31/3633 426/431 |
| 6,137,095 | A * | 10/2000 | Kashimoto | H05B 6/6435 219/678 |
| 6,189,438 | B1 * | 2/2001 | Bielfeldt | A47J 31/08 210/493.5 |
| 6,240,832 | B1 * | 6/2001 | Schmed | A47J 31/3623 221/121 |
| 6,284,459 | B1 * | 9/2001 | Nova | B01J 19/0046 422/68.1 |
| 6,329,139 | B1 * | 12/2001 | Nova | B01J 19/0046 209/597 |
| 6,340,588 | B1 * | 1/2002 | Nova | B01J 19/0046 435/287.1 |
| 6,347,651 | B2 * | 2/2002 | Jeannin | B65D 77/30 141/351 |
| 6,350,970 | B1 * | 2/2002 | Huggler | A47J 37/0842 200/1 A |
| 6,479,086 | B1 * | 11/2002 | Knepler | A47J 31/0621 426/231 |
| 6,510,783 | B1 * | 1/2003 | Basile | A47J 31/3633 99/281 |
| 6,543,335 | B1 * | 4/2003 | Lassota | A47J 31/007 99/283 |
| 6,587,739 | B1 * | 7/2003 | Abrams | G05B 15/02 340/12.32 |
| 6,634,279 | B2 * | 10/2003 | D'Antonio | G01F 23/2962 73/290 V |
| 6,658,989 | B2 * | 12/2003 | Sweeney | A47J 31/0642 99/306 |
| 6,660,982 | B2 * | 12/2003 | Thorneywork | H05B 6/6438 219/490 |
| 6,676,014 | B2 * | 1/2004 | Catan | G06Q 10/087 235/375 |
| 6,685,365 | B2 * | 2/2004 | White | G02B 6/3636 385/102 |
| 6,698,333 | B2 * | 3/2004 | Halliday | A47J 31/4492 426/77 |
| 6,708,600 | B2 * | 3/2004 | Winkler | A47J 31/3695 99/295 |
| 6,725,762 | B2 * | 4/2004 | Kollep | A47J 31/46 99/283 |
| D489,930 | S * | 5/2004 | Tse | A47J 31/46 D7/306 |
| 6,758,130 | B2 * | 7/2004 | Sargent | A23F 3/14 426/115 |
| 6,763,759 | B2 * | 7/2004 | Denisart | A47J 31/36 99/295 |
| 6,820,535 | B2 * | 11/2004 | Fischer | A47J 31/3628 99/289 R |
| 6,931,984 | B2 * | 8/2005 | Lassota | A47J 31/52 99/280 |
| 6,948,420 | B2 * | 9/2005 | Kirschner | B65D 85/8043 426/77 |
| 6,955,116 | B2 * | 10/2005 | Hale | A47J 31/0673 99/289 R |
| 6,978,682 | B2 * | 12/2005 | Foster | A47J 31/44 73/818 |
| 6,990,891 | B2 * | 1/2006 | Tebo, Jr. | A47J 31/0647 99/295 |
| 6,994,879 | B2 * | 2/2006 | Cirigliano | A47J 31/0642 426/433 |
| 7,015,041 | B2 * | 3/2006 | Santarsiero | B01J 19/0046 436/179 |
| 7,028,604 | B2 * | 4/2006 | Cortese | A47J 31/3628 99/295 |
| 7,032,818 | B2 * | 4/2006 | Thomas | B67D 1/0884 235/381 |
| 7,093,530 | B2 * | 8/2006 | Meister | A47J 31/0647 99/295 |
| 7,165,488 | B2 * | 1/2007 | Bragg | A47J 31/0673 426/433 |
| 7,223,427 | B2 * | 5/2007 | Knepler | A47J 31/057 141/192 |
| 7,243,867 | B2 * | 7/2007 | Steckhan | A47J 42/50 241/100 |
| 7,325,479 | B2 * | 2/2008 | Laigneau | A47J 31/3695 99/295 |
| 7,444,925 | B2 * | 11/2008 | Mahlich | A47J 31/3623 99/289 P |
| 7,464,636 | B2 * | 12/2008 | Mariller | A47J 31/0652 99/289 P |
| 7,504,930 | B2 * | 3/2009 | Beyda | G08C 17/02 340/309.16 |
| 7,506,576 | B1 * | 3/2009 | Lassota | A47J 31/52 99/280 |
| 7,513,412 | B2 * | 4/2009 | Benedetti | A47J 31/3623 235/375 |
| 7,607,385 | B2 * | 10/2009 | Halliday | A47J 31/0673 99/280 |
| 7,640,755 | B1 * | 1/2010 | Kateman | A23G 9/08 222/52 |
| 7,640,843 | B2 * | 1/2010 | Halliday | A47J 31/4407 426/115 |
| 7,650,831 | B2 * | 1/2010 | Denisart | A47J 31/3695 99/295 |
| 7,654,190 | B2 * | 2/2010 | Greiwe | A47J 31/4482 222/148 |
| 7,669,518 | B2 * | 3/2010 | Bardazzi | A47J 31/0668 99/289 R |
| 7,676,555 | B2 * | 3/2010 | Bushee | G06F 17/30864 709/203 |

(56) References Cited

U.S. PATENT DOCUMENTS

| | | | | |
|---|---|---|---|---|
| 7,712,341 B2* | 5/2010 | Johansson | E05B 47/063 | 70/277 |
| 7,726,233 B2* | 6/2010 | Kodden | A61B 1/0051 | 99/284 |
| D623,463 S* | 9/2010 | Struzka | A47J 31/0673 | D7/306 |
| 7,798,054 B2* | 9/2010 | Evers | A47J 31/407 | 222/129.1 |
| 7,798,055 B2* | 9/2010 | Mandralis | A47J 31/0673 | 99/284 |
| 7,815,953 B2* | 10/2010 | Mastropasqua | B65D 85/8043 | 426/433 |
| 7,823,501 B2* | 11/2010 | Rijskamp | A47J 31/44 | 99/304 |
| 7,827,905 B2* | 11/2010 | Bardazzi | A47J 31/368 | 99/289 R |
| 7,838,239 B2* | 11/2010 | Mitsuhashi | C12Q 1/6883 | 435/6.16 |
| 7,856,919 B2* | 12/2010 | Van Belleghem | A47J 31/0642 | 99/280 |
| 7,856,920 B2* | 12/2010 | Schmed | A47J 31/0673 | 99/289 R |
| 7,883,733 B2* | 2/2011 | Cortese | A47J 31/3628 | 426/433 |
| 7,946,217 B2* | 5/2011 | Favre | A47J 31/0668 | 426/433 |
| 7,963,213 B1* | 6/2011 | Murdock | C12C 13/10 | 99/322 |
| 7,992,486 B2* | 8/2011 | Constantine | A47J 31/44 | 99/275 |
| 7,993,691 B2* | 8/2011 | Yoakim | B65D 85/8043 | 426/112 |
| 8,002,146 B2* | 8/2011 | Cahen | A47J 31/4482 | 141/86 |
| 8,028,616 B2* | 10/2011 | Van Der Meer | A47J 31/0647 | 99/284 |
| 8,033,211 B2* | 10/2011 | Halliday | A47J 31/0673 | 99/279 |
| 8,039,036 B2* | 10/2011 | Knitel | A47J 31/0647 | 426/433 |
| 8,071,147 B2* | 12/2011 | Steenhof | A47J 31/002 | 426/431 |
| 8,074,560 B2* | 12/2011 | Levi | A47J 31/3633 | 99/289 R |
| 8,079,300 B2* | 12/2011 | Jing | A47J 31/3633 | 99/289 R |
| 8,087,347 B2* | 1/2012 | Halliday | A47J 31/4492 | 99/279 |
| 8,091,469 B2* | 1/2012 | Cahen | A47J 31/4482 | 222/108 |
| 8,095,242 B2* | 1/2012 | Quah | A47J 31/56 | 222/67 |
| 8,191,463 B2* | 6/2012 | Spinelli | A47J 31/0668 | 99/280 |
| 8,210,095 B2* | 7/2012 | Brezovnik | A47J 31/369 | 99/279 |
| 8,210,098 B2* | 7/2012 | Boussemart | A47J 31/3633 | 99/289 R |
| 8,225,710 B2* | 7/2012 | De Graaff | A47J 31/405 | 206/0.5 |
| 8,272,319 B2* | 9/2012 | Jarisch | A47J 31/3638 | 99/289 R |
| 8,307,754 B2* | 11/2012 | Ternite | A47J 31/0673 | 99/280 |
| 8,327,754 B2* | 12/2012 | Kirschner | A47J 31/3633 | 426/115 |
| 8,327,755 B1* | 12/2012 | Michalek | A47J 31/057 | 99/280 |
| 8,333,144 B2* | 12/2012 | Boussemart | A47J 31/061 | 99/280 |
| 8,409,646 B2* | 4/2013 | Yoakim | A47J 31/0642 | 426/115 |
| 8,431,175 B2* | 4/2013 | Yoakim | A47J 31/22 | 426/431 |
| 8,468,934 B2* | 6/2013 | Epars | A47J 31/3623 | 222/148 |
| 8,475,860 B2* | 7/2013 | Colantonio | A47J 31/002 | 426/431 |
| 8,567,304 B2* | 10/2013 | Saxton | A47J 31/46 | 426/433 |
| 8,656,827 B2* | 2/2014 | Vanni | B65D 85/8043 | 426/112 |
| 8,658,232 B2* | 2/2014 | Yoakim | A47J 31/22 | 426/431 |
| 8,695,484 B2* | 4/2014 | Mori | A47J 31/44 | 220/908 |
| 8,752,478 B2* | 6/2014 | Nocera | A47J 31/3685 | 99/295 |
| 8,758,844 B2* | 6/2014 | Nocera | A47J 31/3623 | 426/433 |
| 8,800,433 B2* | 8/2014 | Cahen | A47J 31/44 | 99/289 R |
| 8,833,238 B2* | 9/2014 | Hansen | A47J 31/3695 | 99/283 |
| 8,844,427 B2* | 9/2014 | Beutlrock | A47J 31/369 | 99/289 R |
| 8,887,622 B2* | 11/2014 | Bentley | A47J 31/44 | 99/275 |
| 8,931,397 B2* | 1/2015 | Frigeri | A47J 31/4482 | 99/284 |
| 8,950,317 B2* | 2/2015 | Tanner | A47J 31/46 | 99/289 R |
| 8,956,672 B2* | 2/2015 | Yoakim | B65D 85/8043 | 426/77 |
| 8,962,048 B2* | 2/2015 | Gerbaulet | A47J 31/22 | 426/77 |
| 8,974,846 B2* | 3/2015 | Burton-Wilcock | A47J 31/46 | 426/431 |
| 8,978,545 B2* | 3/2015 | Yoakim | A47J 31/22 | 99/289 R |
| 8,986,764 B2* | 3/2015 | Yoakim | A47J 31/22 | 426/115 |
| 9,499,333 B2* | 11/2016 | Magniet | A47J 31/369 | |
| 2002/0009016 A1* | 1/2002 | Ancona | A47J 27/62 | 366/205 |
| 2002/0048621 A1* | 4/2002 | Boyd | A47J 31/3623 | 426/77 |
| 2002/0078831 A1* | 6/2002 | Cai | A47J 31/14 | 99/295 |
| 2002/0088807 A1* | 7/2002 | Perkovic | B65D 85/8043 | 220/654 |
| 2002/0116208 A1* | 8/2002 | Chirnomas | G07F 5/18 | 700/231 |
| 2002/0129712 A1* | 9/2002 | Westbrook | A47J 31/3676 | 99/279 |
| 2002/0148356 A1* | 10/2002 | Lazaris | A47J 31/0668 | 99/295 |
| 2002/0148357 A1* | 10/2002 | Lazaris | A47J 31/3628 | 99/295 |
| 2002/0170473 A1* | 11/2002 | Fettis | A45C 11/182 | 109/23 |
| 2003/0033938 A1* | 2/2003 | Halliday | B65D 85/8043 | 99/275 |
| 2003/0039731 A1* | 2/2003 | Dalton | B65D 85/8043 | 426/433 |
| 2003/0056661 A1* | 3/2003 | Hu | A47J 31/0668 | 99/495 |
| 2003/0067378 A1* | 4/2003 | Baarman | B01D 35/143 | 337/241 |
| 2003/0070458 A1* | 4/2003 | Huang | E05B 47/0002 | 70/283 |
| 2003/0070555 A1* | 4/2003 | Reyhanloo | A47J 31/52 | 99/282 |
| 2003/0094024 A1* | 5/2003 | Dimig | E05B 83/36 | 70/277 |
| 2003/0129286 A1* | 7/2003 | Knepler | A47J 31/057 | 426/231 |

(56) References Cited

U.S. PATENT DOCUMENTS

| | | | |
|---|---|---|---|
| 2003/0145736 A1* | 8/2003 | Green | A47J 31/3633 99/280 |
| 2003/0172813 A1* | 9/2003 | Schifferle | A47J 31/0673 99/275 |
| 2004/0089158 A1* | 5/2004 | Mahlich | A47J 31/3623 99/275 |
| 2004/0188459 A1* | 9/2004 | Halliday | A47J 31/0673 222/83 |
| 2004/0191370 A1* | 9/2004 | Halliday | A47J 31/0673 426/112 |
| 2004/0191372 A1* | 9/2004 | Halliday | A47J 31/0673 426/112 |
| 2004/0197444 A1* | 10/2004 | Halliday | A47J 31/0673 426/112 |
| 2004/0206245 A1* | 10/2004 | Halliday | A47J 31/0673 99/337 |
| 2004/0211322 A1* | 10/2004 | Halliday | A47J 31/0673 99/279 |
| 2004/0244599 A1* | 12/2004 | Wei | A47J 31/0615 99/279 |
| 2004/0250686 A1* | 12/2004 | Hale | A47J 31/0673 99/295 |
| 2005/0034604 A1* | 2/2005 | Halliday | A47J 31/0673 99/279 |
| 2005/0095158 A1* | 5/2005 | Kirschner | A47J 31/3633 417/572 |
| 2005/0172820 A1* | 8/2005 | Cortese | A47J 31/4467 99/279 |
| 2005/0223904 A1* | 10/2005 | Laigneau | A47J 31/3695 99/295 |
| 2006/0000851 A1* | 1/2006 | Girard | A47J 31/407 222/129.1 |
| 2006/0123998 A1* | 6/2006 | Castellani | A47J 31/0673 99/495 |
| 2006/0219098 A1* | 10/2006 | Mandralis | A47J 31/36 99/279 |
| 2007/0104837 A1* | 5/2007 | Yoakim | A47J 31/0668 426/77 |
| 2007/0144355 A1* | 6/2007 | Denisart | B65D 85/8043 99/275 |
| 2007/0148290 A1* | 6/2007 | Ternite | B65D 85/8043 426/90 |
| 2007/0157821 A1* | 7/2007 | Panesar | A47J 31/0673 99/279 |
| 2007/0158366 A1* | 7/2007 | Van Deer Meer | A47J 31/4485 222/222 |
| 2007/0163446 A1* | 7/2007 | Halliday | A47J 31/0673 99/279 |
| 2007/0175334 A1* | 8/2007 | Halliday | A47J 31/4492 99/279 |
| 2007/0261564 A1* | 11/2007 | Suggi Liverani | A47J 31/002 99/279 |
| 2007/0272084 A1* | 11/2007 | Mandralis | A47J 31/4467 99/275 |
| 2008/0000358 A1* | 1/2008 | Goeckner | A47J 31/002 99/281 |
| 2008/0029541 A1* | 2/2008 | Wallace | B01F 13/1055 222/129.3 |
| 2008/0041234 A1* | 2/2008 | Cortese | A47J 31/0673 99/290 |
| 2008/0089982 A1* | 4/2008 | Brouwer | A47J 31/407 426/77 |
| 2008/0105130 A1* | 5/2008 | Koeling | A47J 31/407 99/279 |
| 2008/0115673 A1* | 5/2008 | Zelioli | A47J 31/3638 99/279 |
| 2008/0121111 A1* | 5/2008 | Paget | A47J 31/0668 99/295 |
| 2008/0148948 A1* | 6/2008 | Evers | A47J 31/407 99/275 |
| 2008/0173181 A1* | 7/2008 | Startz | A47J 31/4467 99/279 |
| 2008/0181834 A1* | 7/2008 | Santarsiero | B01J 19/0046 422/245.1 |
| 2008/0187638 A1* | 8/2008 | Hansen | A47J 31/0673 426/433 |
| 2008/0245236 A1* | 10/2008 | Ternite | A47J 31/0668 99/295 |
| 2008/0250936 A1* | 10/2008 | Cortese | A47J 31/0668 99/295 |
| 2008/0302251 A1* | 12/2008 | Rijskamp | A47J 31/407 99/295 |
| 2009/0022864 A1* | 1/2009 | Steenhof | A47J 31/007 426/433 |
| 2009/0183640 A1* | 7/2009 | Ozanne | A47J 31/3695 99/295 |
| 2009/0186137 A1* | 7/2009 | Ohresser | A23F 5/08 426/433 |
| 2009/0211456 A1* | 8/2009 | De Graaff | A47J 31/405 99/279 |
| 2009/0211457 A1* | 8/2009 | Cortese | A47J 31/3609 99/289 R |
| 2009/0219140 A1* | 9/2009 | Guard | A47J 31/4492 340/10.1 |
| 2009/0320693 A1* | 12/2009 | Ozanne | A47J 31/0673 99/295 |
| 2009/0324791 A1* | 12/2009 | Ohresser | A47J 31/0673 426/433 |
| 2010/0112166 A1* | 5/2010 | Levin | A47J 31/005 426/433 |
| 2010/0132564 A1* | 6/2010 | Ozanne | A47J 31/407 99/275 |
| 2010/0147873 A1* | 6/2010 | Tanner | A47J 31/3638 99/295 |
| 2010/0173056 A1* | 7/2010 | Yoakim | A47J 31/22 426/433 |
| 2010/0178404 A1* | 7/2010 | Yoakim | A47J 31/22 426/431 |
| 2010/0263546 A1* | 10/2010 | Leuzinger | A47J 31/3676 99/295 |
| 2010/0313766 A1* | 12/2010 | Suggi Liverani | A47J 31/0673 99/295 |
| 2011/0011273 A1* | 1/2011 | Evers | B65D 1/32 99/295 |
| 2011/0100228 A1* | 5/2011 | Rivera | A47J 31/446 99/281 |
| 2011/0117248 A1* | 5/2011 | Rivera | A47J 31/085 426/77 |
| 2011/0154993 A1* | 6/2011 | Bertolina | A47J 31/4407 99/280 |
| 2011/0183055 A1* | 7/2011 | Mariller | A47J 31/0673 426/433 |
| 2011/0226343 A1* | 9/2011 | Novak | A23L 2/54 137/12.5 |
| 2011/0250333 A1* | 10/2011 | Ozanne | A47J 31/002 426/435 |
| 2011/0262601 A1* | 10/2011 | Manser | A23L 1/296 426/231 |
| 2011/0265659 A1* | 11/2011 | Giua | A47J 31/3676 99/295 |
| 2011/0274802 A1* | 11/2011 | Rivera | A47J 31/0668 426/431 |
| 2011/0297002 A1* | 12/2011 | Vitel | A47J 31/3614 99/287 |
| 2011/0308397 A1* | 12/2011 | Sinot | A47J 31/4492 99/283 |
| 2012/0031279 A1* | 2/2012 | Mariller | A47J 31/3695 99/295 |
| 2012/0055343 A1* | 3/2012 | Remo | A47J 31/3614 99/289 P |
| 2012/0058226 A1* | 3/2012 | Winkler | A47J 31/3695 426/79 |
| 2012/0098526 A1* | 4/2012 | Bucher | A47J 31/4492 324/204 |
| 2012/0121765 A1* | 5/2012 | Kamerbeek | A47J 31/0673 426/77 |
| 2012/0156336 A1* | 6/2012 | Hansen | A47J 31/0605 426/231 |

(56) References Cited

U.S. PATENT DOCUMENTS

| | | | | |
|---|---|---|---|---|
| 2012/0171334 A1* | 7/2012 | Yoakim | A47J 31/22 | 426/87 |
| 2012/0199010 A1* | 8/2012 | Mariller | A47J 31/0668 | 99/295 |
| 2012/0207896 A1* | 8/2012 | Rivera | A47J 31/0689 | 426/433 |
| 2012/0210878 A1* | 8/2012 | Mariller | A47J 31/0668 | 99/295 |
| 2012/0251671 A1* | 10/2012 | Kamerbeek | A47J 31/368 | 426/77 |
| 2012/0255448 A1* | 10/2012 | Ozanne | A47J 31/4492 | 99/280 |
| 2012/0260805 A1* | 10/2012 | Ozanne | A47J 31/4492 | 99/280 |
| 2012/0295234 A1* | 11/2012 | Rognon | A47J 31/3623 | 434/127 |
| 2012/0308688 A1* | 12/2012 | Peterson | A47J 31/002 | 426/86 |
| 2012/0312174 A1* | 12/2012 | Lambert | A47J 31/3638 | 99/295 |
| 2012/0321756 A1* | 12/2012 | Estabrook | A47J 31/407 | 426/115 |
| 2012/0328740 A1* | 12/2012 | Nocera | A47J 31/3623 | 426/82 |
| 2013/0025465 A1* | 1/2013 | Schnyder | A47J 31/44 | 99/289 R |
| 2013/0068110 A1* | 3/2013 | Pagano | A47J 31/3638 | 99/295 |
| 2013/0095214 A1* | 4/2013 | Ozanne | A47J 31/407 | 426/115 |
| 2013/0125758 A1* | 5/2013 | Lodeweges | A47J 31/404 | 99/275 |
| 2013/0171320 A1* | 7/2013 | Scholvinck | A47J 31/402 | 426/590 |
| 2013/0230627 A1* | 9/2013 | Hansen | A47J 31/0689 | 426/231 |
| 2013/0236609 A1* | 9/2013 | Magniet | A47J 31/369 | 426/87 |
| 2013/0344206 A1* | 12/2013 | Yoakim | A47J 31/52 | 426/232 |

FOREIGN PATENT DOCUMENTS

| | | |
|---|---|---|
| WO | 2008132571 | 11/2008 |
| WO | 2009077488 | 6/2009 |
| WO | 2009082198 | 7/2009 |
| WO | 2010003878 | 1/2010 |

* cited by examiner

CAPSULE, BEVERAGE PRODUCTION MACHINE AND SYSTEM FOR THE PREPARATION OF A NUTRITIONAL PRODUCT

PRIORITY CLAIM

The present application is a divisional of U.S. patent application Ser. No. 13/884,878 filed May 10, 2013, which is a National Stage of International Application No. PCT/EP2011/069814 filed Nov. 10, 2011, which claims priority to European Patent Application No. 10190899.4 filed Nov. 11, 2010 and European Patent Application No. 11164349.0 filed Apr. 29, 2011, the entire contents of which are incorporated herein by reference.

FIELD OF THE INVENTION

The present invention relates to field of the preparation of beverages by use of beverage production machine. In particular, the invention relates to a removable insert provided with an optical code such as a capsule, a rinsing/descaling tool or capsule holder, and also relates to a beverage production machine and a system for the preparation of a nutritional product in combination with a supplied liquid. In particular, the invention relates to a capsule for containing a nutritional ingredient, wherein the capsule is provided with an optical code, a beverage production machine for the supply of the liquid, which is provided with a code reader to read optically readable codes, and a system for reading an optically readable code on a capsule with a code reader of a beverage production machine.

A nutritional product containing nutritional ingredients can be prepared by inserting a capsule containing nutritional ingredients into a beverage production machine, and by supplying a liquid to the capsule by means of the beverage production machine. The nutritional ingredients in the capsule are mixed with the liquid, and the mixture is output as the nutritional product. Typically, such capsules are held in a tight position by a capsule holder of the beverage production machine, are perforated by the machine, and then liquid is injected into the capsule.

The nutritional product can be for instance infant formula, but can also comprise nutritional liquids for toddlers, invalids, elderly people, persons having nutritional deficiencies or athletes. The nutritional product is prepared from the nutritional ingredients, which can be contained in the capsule, by the addition of a liquid, such as water, milk, soup or the like. Typically each nutritional product requires special individual preparation parameters, such as the volume of used liquid, the liquid temperature, or other possible parameter (e.g., the liquid pressure, flow rates, etc.), which also depend on the capsule type. Correct preparation parameters are crucial for a proper preparation of the nutritional product. It is thus desirable that a beverage production machine automatically determines the correct preparation parameters for an inserted capsule, so that the preparation of the nutritional product becomes faster and more convenient for the user. In particular, an infant formula preparation system using coded capsules of different sizes is described in WO2010003878 to facilitate preparation of the nutritional product as function of a feeding plan, in particular related to the age of the infant (such as to follow the change overtime of breast milk).

Further, it occurs rather often that removable inserts such as capsules, which have already been used, are forgotten by the user in the beverage production machine. It is therefore further desirable to provide a way to prevent accidental reuse of such inserts, in particular capsules, in the beverage production machine.

In the context of the invention, the term "capsule" refers to any rigid or semi-rigid container containing beverage ingredient. Other synonymous to a capsule are: "pod", "pad" or "cartridge". The capsule can be single use. The capsule can also be filled with ingredient by the user to form the capsule just before use. The capsule can be formed of different separable pieces before insertion in the beverage production machine.

Devices for reading a code on a capsule, and capsules provided with a code exist, for example such as are disclosed in WO 02/28241.

Further, in WO2004064585, a capsule comprises an optically readable code on a (top) foil, and a reader for interpreting the code is integrated in the injection/extraction head of a beverage production machine. The reader is located close to the liquid injector and/or to the beverage outlets. This arrangement thus often creates reading problems, because the window of the reader tends to become dirty very rapidly. Regular cleaning is therefore necessary, in order to ensure a reliable automatic recognition of the capsule.

In US 2007157821, a minimum angular separation of a barcode from the inlet is provided, in order to improve the accuracy of reading the barcode with recognition means of a beverage production machine.

WO 2008144462 relates to a delivery head of a beverage preparation machine comprising an upwardly directed inlet for supplying water to a cartridge received in the delivery head, a downwardly directed outlet for outflow of beverage, and a barcode reader having a barcode reader window, through which signals may be transmitted. The inlet, the outlet and the barcode reader window are arranged in a line, with the outlet being intermediate the inlet and the barcode reader window.

Other solutions have been developed to improve the reliability of code detection, such as in WO2009/007292, in which a reading apparatus is activated before a brewing chamber of a beverage production machine is closed, with the result that several images of a code are recorded before the closure position is reached. However, this creates additional complexity in the recognition process, and does not fully correct the problems of dirty surfaces.

WO2010003878 relates to a portion-controlled nutrition system for persons requiring a differentiated nutritional feeding such as infants by means of capsules of different sizes which are identified by a (circular) barcode on the inlet foil.

In conclusion, none of the cited documents provides a satisfactory solution to the problem that optically readable codes applied to removable inserts, such as capsules, are very sensitive to liquid, vapor and a dirty environment, such as can occur over time in a beverage production machine. An automatic detection of an optically readable code on a capsule can thus be easily altered or inhibited by such contamination, and a proper preparation of a nutritional product becomes difficult. In particular for dairy-based nutritional products, such as infant formula, the above-mentioned problems become very critical. Dirty surfaces inside a beverage production machine further cause hygiene issues, and therefore need to be cleaned regularly.

SUMMARY

Therefore, it is a further object of the present invention to improve the state of the art, and in particular to provide an improved automatic detection of removable inserts, in particular (but non-exclusively) capsules, in a beverage production machine. The beverage production machine should also be easier to clean, and the automatic detection should be less prone to fail due to a contamination of the reading means.

The objective problems are solved by the independent claims of the present invention, which are directed to an removable insert, e.g., a beverage capsule, a beverage production machine, and a system thereof, respectively. The dependent claims develop further advantages of each solution.

In a main mode, the present invention comprises a capsule for containing nutritional ingredients and designed for insertion in a beverage production machine, the capsule comprising a cup-shaped base body having a bottom, a side wall and an inlet face, wherein the inlet face of the cup-shaped base body presents a contour, which is not symmetric in rotation and presents a bulge section extending from an essentially circular section, wherein an optically readable code is provided on the side wall at a position which, when viewing the capsule from the inlet face, is located opposite the bulge section.

The optically readable code is positioned on a side wall of the cup-shaped base body of the capsule, in order to prevent that the optically readable code becomes soiled with liquid, vapor or other dirt in the beverage production machine. The optically readable code is positioned away from the inlet face of the capsule, and even preferably from the liquid inlet area itself, into which in the beverage production machine liquid will be injected. The contour of the inlet face, which is not symmetric in rotation, and in particular the bulge section further provide a positioning aid for positioning the optically readable code in the beverage production machine so that it can be properly read. Preferably, the liquid inlet area, e.g., a liquid inlet opening and/or reservoir, of the capsule is located on the inlet face in the bulge section of the capsule. The opposite location of the code relative to the bulge section is also advantageous in that the code is even more distant from the liquid injection area. A machine, in which the capsule is designed to be inserted, can then automatically detect the capsule type, and can set appropriate preparation parameter(s). Thus, such a machine is faster and easier to operate by a user.

Preferably, the cup-shaped body comprises an upper flange delimiting the non-symmetrical contour of the inlet face including the bulge section. The code is therefore positioned on the side wall below the upper flange. Preferably, it is placed at a distance of at least 5 mm below the flange and at a distance of at least 10 mm above the bottom. The flange when inserted in the capsule holder provides in a further barrier against seepage of liquid.

Preferably, the wall member is sealed onto the upper flange. The wall member can be a foil member intended for being perforated or removed, in order to allow liquid supply into the capsule. In an alternative, the wall member can be a pre-perforated wall. The bottom of the cup-shaped base body is provided with one or more outlets, wherein the optically readable code is provided on the side wall between the inlet face and the bottom.

By positioning the optically readable code between the inlet face, into which the liquid will be injected in a beverage production machine, and the bottom, from which a nutritional product will be output, the optically readable code and the code reading technology on the machine's side are prevented from coming into contact with the liquid on the injection or output side. Thus contamination of the optically readable code is prevented or at least considerably reduced.

Preferably, the capsule comprises a fluid inlet unit provided in a dedicated seat of the body below the bulge section of the inlet face of the capsule. The advantage is that a dedicated fluid inlet is present in the capsule which is positioned at the opposite of the optically readable code (when viewing the capsule from the inlet face). A fluid inlet unit is meant here to be at least a portion of wall of the capsule comprising at least one liquid inlet opening. Preferably, the fluid inlet unit forms a casing comprising at least one dedicated liquid inlet communicating with the cavity of the body containing the nutritional ingredients via at least one conduit or passage. Most preferably, the fluid inlet unit forms a casing comprising at least one dedicated liquid inlet and at least dedicated one gas inlet. The liquid and gas inlets are preferably transversally distant from one another on the inlet face. The casing may be covered by the foil member which is perforated by the machine at the dedicated liquid and/or inlets Preferably, the capsule further comprises a filter adapted for removing contaminants contained in the supplied liquid. The hygiene of the nutritional product can thus be improved. The filter may be placed in the seat such as part of the fluid inlet unit. In particular, the filter is encased in the casing as described in co-pending international patent applications PCT/EP2010/056005 or PCT/EP2010/056043. However, the filter could be placed anywhere between the inlet wall and the ingredients in the capsule or even between the ingredients and the bottom such as it is described in WO 2009/092629 or WO 2010/112353.

It should be noticed that the capsule could be formed of separate parts which are assembled just before insertion in the beverage production machine by the user. For instance, the body and the fluid inlet unit and/or filter can be separate elements. At least one of these elements can be re-usable. For instance, the filter unit can be a part which is used several times whereas the body bearing the optically detectable code is intended for a single use. The capsule may thus be filled before use by the user with selected ingredients. Most preferably, the capsule is filled with a metered amount of nutritional ingredients in controlled hygiene (sterile if required) conditions and sealed by the inlet foil onto the flange of the body to form a closed interior that is opened, e.g., perforated, at the last moment of the preparation in the beverage preparation machine. The interior of the capsule can be further filled with inert gas such as nitrogen.

The present invention is further directed to a beverage production machine for the preparation of a nutritional product comprising, a housing, a reservoir for holding a liquid, a capsule holder removably insertable in the housing for holding a capsule for containing nutritional ingredients, a liquid injection assembly provided in the housing for supplying liquid held in the reservoir to a capsule held in the capsule holder, and an optical code reading assembly of the beverage production machine for reading an optically readable code, wherein the capsule holder is interposed, when inserted in the housing, between the liquid injection assembly and the code reading assembly.

Therefore, the capsule holder forms a protection barrier against contamination by splashing or spurting liquid on the code and/or code reading assembly.

Preferably, the optical code reading assembly comprises a code reader provided on a frame of the beverage production machine for reading an optically readable code, wherein the frame is located outside of the housing.

Since the code reader is provided on a frame of the beverage production machine, which is located outside of the housing, which contains the liquid injection assembly, the code reader is protected from contamination by splashing or spurting liquid, and can thus reliably detect optically readable codes. Further, the code reader needs not to be cleaned as often.

Preferably, the liquid injection assembly comprises an injection plate adapted to move from an upward un-engaged to a downward engaged position (and vice versa) in the housing, and a liquid needle adapted to be extended through said opening and to inject liquid into a capsule in the downward engaged position. The engaged position is meant here to be the position of the injection plate pressing in liquid-tight engagement against the capsule when the capsule holder is inserted in the housing.

The injection plate is preferably in an upward non-engaged position in the housing, when a capsule is inserted into the machine, and when liquid is to be injected into the capsule. Otherwise the injection plate is in a downward engaged position against the capsule and capsule holder so that it can prevent liquid from seeping towards the capsule holder or towards the code reader, where it could alter the functionality of the automatic capsule detection.

Preferably, the housing comprises a window positioned between the inserted capsule holder and the code reader. The window is preferably made of plastic or glass, which is transparent to light emitted from the code reader.

Preferably, the code reader comprises one or more light emitting diodes, LEDs, to illuminate an optically readable code, a focusing lens to acquire an image of the optically readable code, a charge coupled device, CCD, for producing an electrical signal representative of the acquired image, and support circuitry for the one or more LEDs and the CCD.

Preferably, the housing comprises a window positioned in the propagation direction of the light emitted from the one or more LEDs, and the window is preferably made of plastic or glass, which is transparent to said emitted light.

The window protects the code reader from liquid, vapor and dirt, but allows the code reader to read optical codes without hindrance.

The capsule holder preferably comprises an aperture for uncovering an optically readable code of the capsule; said aperture being aligned with the window in the housing.

The capsule holder is preferably configured to be inserted in the housing of the machine in a substantially rectilinear movement by means of complementary slider of the housing cooperating with sliding edges of the capsule holder.

Preferably, when the injection plate is downwardly engaged on the capsule and capsule holder, the injection plate becomes positioned in a liquid tight engagement with the capsule and/or capsule holder onto which the closure pressing forces of the plate are exerted. As a result, substantially no liquid is able to travel from the liquid injection assembly to the window.

The capsule holder further comprises liquid draining channels positioned parallel to the said aperture. Thus, the capsule holder prevents that the window becomes soiled with liquids in the upward position of the injection plate, when, which reduces the cleaning effort of the window. Further, the operation of the code reader is not compromised by liquid, vapor or the like on the window, which would reduce the transparency for the emitted light.

Preferably, the window is oriented along a plane which forms an angle, which is preferably in a range of 110° and 160°, more preferably 130° to 140° relative to the bottom plane of the capsule in the inserted capsule holder.

The angle is chosen so that the best compromise is found between an angle, which prevents liquid from flowing onto and sticking to the window, and an angle, which allows the optical code reader to read an optically readable code on a capsule inserted into the beverage production machine.

The invention also relates to a beverage production machine for the preparation of a nutritional product from capsules containing nutritional ingredients comprising a housing, a reservoir for holding a liquid, a capsule holder removably insertable in the housing for holding a capsule containing nutritional ingredients, a liquid injection assembly provided in the housing for supplying liquid held in the reservoir to a capsule held in the capsule holder, an optical code reading assembly comprising a code reader for reading an optically readable code on each capsule placed in the capsule holder when the capsule holder is inserted in the housing, a control unit with a memory for memorizing the last optically readable codes read by the code reader, such as the last 10 or 20 optically readable codes, wherein the control unit is adapted to deactivate the beverage production machine and/or to provide a warning signal to the user of the beverage production machine, in case that an optically readable code read by the code reader corresponds to one of the last memorized optical codes, and is adapted to set at least one preparation parameter, for the nutritional product, such as the volume of supplied liquid in the capsule, according to the optically readable code of the capsule read by the code reader in case the optically readable code does not correspond to the one of the last memorized optically readable codes.

An accidental reuse of a capsule is thus prevented, which could otherwise easily occur, if the user forgets to take out the capsule from the device after usage. Furthermore, at least one preparation parameter chosen amongst the list of: liquid temperature, the liquid volume, the liquid flow rate, liquid pressure, type of liquid and combinations thereof, can be automatically set by the control unit, whereby the usage of the beverage production machine becomes faster and more convenient.

The present invention is further directed to a system comprising a beverage production machine as described above, and a capsule as described above, wherein the capsule in the capsule holder, and the capsule holder in the beverage production machine are positioned such that the optically readable code faces the window of the housing.

The contour of the inlet face of the capsule, which is not symmetric in rotation, aids the correct positioning of the capsule in the capsule holder, so that in consequence, since the capsule holder slides fitted into the beverage production machine, the optically readable code on the capsule will always be positioned precisely, where it can be read by the code reader of the beverage production machine.

Preferably, the liquid needle is adapted to extend through the opening in the housing, and to supply liquid into the capsule.

Preferably, the capsule comprises one or more outlets preferably oriented parallel to the flow direction of the liquid injected by the liquid needle, wherein the one or more outlets are placed downstream of the window in respect to the liquid flowing through the capsule from the liquid needle to the one or more outlets.

Since the one or more outlets are oriented parallel to the flow direction of the liquid, they take an angle with the normal direction of the window plane preferably in a range of 20° to 70°, more preferably 40° to 50°, the same as the angle of the flow direction of the liquid supplied by the liquid needle described above. The danger of liquid splashing or spurting towards and onto the window is thus reduced. By placing the one or more outlets downstream, i.e. below the window in respect to the liquid flowing through the capsule, another protection measure to avoid contamination of the window with liquid is provided.

Preferably, the optically readable code is a barcode, preferably comprising at least one byte of "n" digits corresponding to a serial number of the capsule. Other bytes of one or more digits are preferably used for identifying the type of capsules for setting parameter(s).

By integrating serial numbers of the capsules into the optically readable code, multiple usage of a single capsule can be avoided, and the optimal preparation parameters for each individual capsule can be set by the beverage production machine according to the serial number of the capsule.

The invention further relates to a removable insert other than a capsule which comprises a body having a bottom or fluid delivery side, a top or fluid supply side and a frontal sidewall opposite a rear side, wherein the fluid supply side presents a contour which is not symmetrical in rotation and presents a bulge section, e.g., of smaller surface area, extending from said main section, wherein an optical code is provided on the frontal sidewall at a position which, when viewing the insert from fluid supply side is located opposite the bulge section. Preferably, the bulge section comprises a liquid inlet opening at the fluid supply side. The removable insert can be a rinsing and/or descaling insert or another tool or open container Tillable with food ingredients. The outlet face comprises at least one outlet which is axially distant from the inlet opening. As aforementioned, the optical readable code can be a barcode provided with instructions or data as to the operation of the insert or other inserts in the machine.

The invention further relates to a removable capsule holder comprising:

a seat for receiving a capsule having a frontal sidewall, guiding means for slidably guiding the capsule holder in a housing of the beverage production machine; said seat comprising a main capsule support section and a smaller bulge capsule support section extending from the main capsule support section and opposite the frontal sidewall; wherein an optical readable code is provided on the frontal sidewall of the seat at a position which, when viewing the capsule holder from the top, is located opposite the bulge capsule support section.

As aforementioned, the optical readable code can be a barcode provided with instructions or data as to the operation of inserts such as capsules or other inserts in the machine.

In summary, the present invention provides solutions for an optically readable code on a capsule or other removable inserts, and a beverage production machine comprising a code reader, wherein both are protected from liquid, vapor, dirt and the like in a beverage production machine. By providing the optically readable code on the capsule, accidental reuse of capsules can be avoided, and preparation parameters can be set automatically according to the type of capsule. The solution makes the beverage production machine easier to clean, and more convenient to operate.

In the following, a detailed description of the present invention with reference to the attached drawings will be given.

DETAILED DESCRIPTION

Figure 1A:
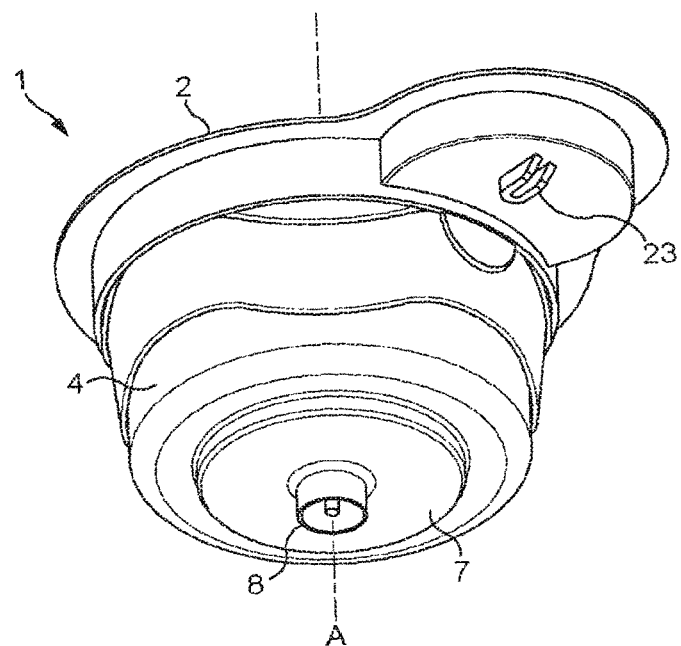
FIGS. 1a-1d show a capsule according to the present invention from different perspectives.
Figure 1B:
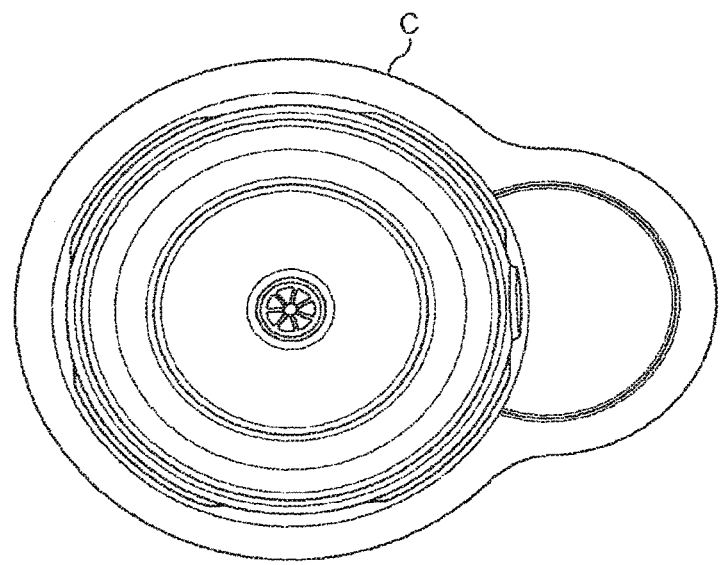

The general aspect of the capsule 1 according to the present invention, which is designed for insertion into a beverage production machine 10, is illustrated in connection with FIGS. 1a-1d, and FIGS. 2a-2d. The capsule 1 generally comprises a cup-shaped base body 2 for receiving nutritional ingredients. As shown in FIGS. 1a and 1b the cup-shaped base body 2 has a bottom 7, a side wall 4 and an inlet face C, which has a contour, which is not symmetric in rotation, when viewed from the top of the capsule along a longitudinal axis A of the capsule. The inlet face C presents a bulge section 2b extending from an essentially circular section 2a, and can be closed by a liquid impermeable foil member 5, which can be sealed to an upper flange like rim 6 of the inlet face C. The foil member 5 may be simply liquid impervious or, most preferably, liquid and gas impervious. In particular, the membrane can be a multilayer comprising a gas barrier such as EVOH and/or aluminum. As will be explained in more detail later on, the top membrane is made of a puncturable material such as thin polymer and/or aluminum to enable liquid to be supplied by means of a liquid injector, like a liquid needle 14b described later, on one hand, and gas, e.g. air, to be supplied to the capsule 1 by means of a gas injector, like an air needle 14c described later, on the other hand.

The bottom 7 of the cup-shaped base body 2 comprises at least one outlet 8 intended for the release of the liquid nutritional composition/product from the capsule 1. The outlets 8 may comprise one or several openings for streaming of the liquid composition towards a receptacle such as a baby bottle, glass or cup. The outlets 8 may extend from the bottom 7 of the cup-shaped base body 2 by a short duct for directing the flow of liquid and reducing side projections of liquid, which could contaminate the surroundings of the receptacle.

The inlet face C of the capsule 1 extends as mentioned above in a bulge section 2b, which preferably is adapted to receive a fluid inlet unit such as a filter 9 for filtering liquid supplied to the capsule 1. The term "bulge" does not refer to a specific shape of the section but only indicate a protrusion or convex section extending from the main circular section. The term "circular" is also not restricted to a pure circle but encompass slight shape variations such as a corrugated closed rounded contour. The main way to automatically detect the type of capsule 1 by means of an optically readable code 3 on the side wall 4 of the capsule 1 will be explained below in more detail.

The capsule 1 comprises the cup-shaped base body 2 for containing nutritional ingredients. The volume of the cup-shaped base body 2 may vary depending on the volume of liquid to be injected into the capsule 1. In general, a large volume is preferred for large volume of liquid so that the cup-shaped base body 2 serves as a mixing bowl for the ingredients and liquid to form the composition.

Further, the capsule 1 may comprise in the bottom 7 of the cup-shaped base body 2 a product delivery system (not shown) for ensuring a proper interaction of the supplied liquid and the ingredients contained in the cup-shaped body 2 of the capsule 1, and for reducing, preferably avoiding, contact of nutritional liquid with the beverage production machine 10. In a particular mode, the product delivery system is designed to open at least one orifice through the capsule 1 for delivery of the composition when a sufficient pressure of liquid has been reached in the cup-shaped base body 2. For this, the bottom 7 of the cup-shaped base body 2 can comprise perforating elements strategically placed to perforate a lower foil member (not shown) separating the cup-shaped base body 2 from the one or more outlets 8. The lower foil member is typically a thin, liquid-tight membrane, which can be perforated, made of aluminum and/or polymer. The membrane is sealed at the bottom edge of the cup-shaped base body 2. For instance, the membrane 25 is a 30-micron foil of aluminum. It should be noted that the product delivery system can be designed differently. For instance, it can be a simple valve comprising an orifice or slot normally closed and which opens under the pressure which builds in the compartment as resulting from the liquid being supplied in. In another alternative, it can also be a porous wall forming a product filter.

The capsule 1 of the invention is preferably designed to ensure filtration of the liquid being supplied into the cup-shaped base body 2. The rationale for filtration of incoming liquid is essentially linked to the requirement for controlling a perfect quality of the liquid, e.g., water, entering in the delivered composition. Water can be supplied at a temperature of service, e.g., at about 23° C.-40° C., by heating of ambient liquid coming from a reservoir 12 of a beverage production machine 10. More preferably, the filtration is carried out to remove contaminants including microorganisms such as bacteria, yeast or molds and eventually viruses, e.g., which have not been destroyed by the liquid heating operation. For this, a solution can consist in inserting, in a predetermined area of the capsule 1, a filter unit 9 in the form of a pressure resistant, handleable unit comprising an outer protective casing, and at least one filter media, in particular, a filter membrane. The filter unit 9 is preferably rigid in the sense that it is more rigid than the filter membrane and preferably, it is also resistant to significant deflection upon application of the liquid and sealing pressure exerted by the liquid coming out of a liquid needle 14b of a beverage production machine 10, and by the sealing engagement of beverage production machine 10 itself onto the capsule 1. The filter unit 9 presents the advantage to facilitate the placing of the filter technology in the capsule 1, without requiring specific connection means, and it reduces the risk of damaging the filter membrane. It should be noticed that the filter unit 9 can be a simple fluid injection unit without inside filter in case the delivered nutritional product does not need to fulfill strict hygienic requirements (e.g., for example, for adult nutrition).

For antimicrobial purpose (e.g., for infant nutrition), the filter unit comprises a filter membrane. The filter membrane has preferably a pore size of less than 0.4 microns, most preferably of less than 0.2 microns. It may have a thickness of less than 500 microns, preferably between 10 and 300 microns. The material of the membrane can be chosen from the list consisting of PES (polyethersulfone), cellulose acetate, cellulose nitrate, polyamide and combinations thereof.

In particular, the filter unit 9 is insertable in a filter receiving seat 2c formed in the bulge section 2b of the inlet face C. The filter receiving seat 2c is so designed to position the filter unit 9 in an off-centered manner relative to the mouth of the cup-shaped base body 2 at the circular section 2a. As a result, the deformation of the capsule 1 due to the pressure of liquid and the sealing with the device can be reduced compared to a more central positioning above the cup-shaped base body 2. The filter receiving 2c seat may be, for instance, a U-shaped cavity of relatively low depth compared to the depth of the cup-shaped base body 2. The seat 2c then has a bottom wall and a sidewall matching at least part of the bottom and sidewall of the filter unit 9, in particular, of its larger portion. The filter unit 9 may not require any specific connection with the filter receiving seat 2c but it is simply maintained in place by the complementary shapes of the unit 9, e.g., by press-fitting, in the seat 2c and the closure obtained by the foil member 5. For instance, the seat 2c may comprise corrugations or recesses in its sidewall, e.g., near the cup-shaped base body 2, for receiving the filter unit 9 by press-fitting (not shown).

Figure 1C:
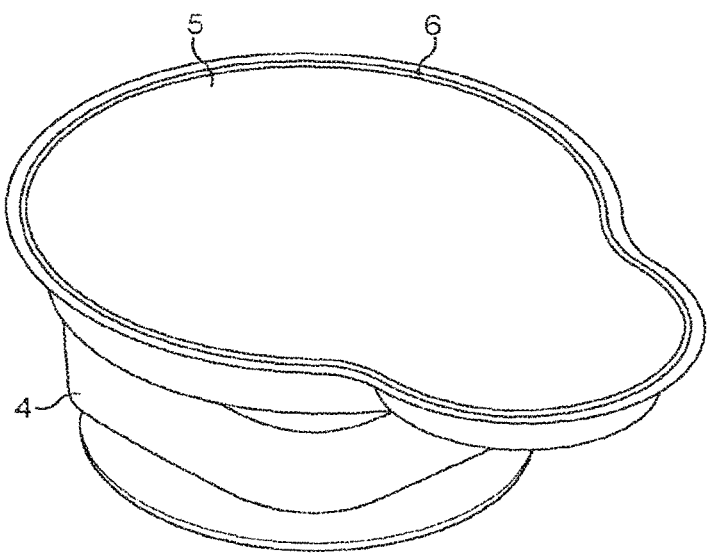
Figure 1D:
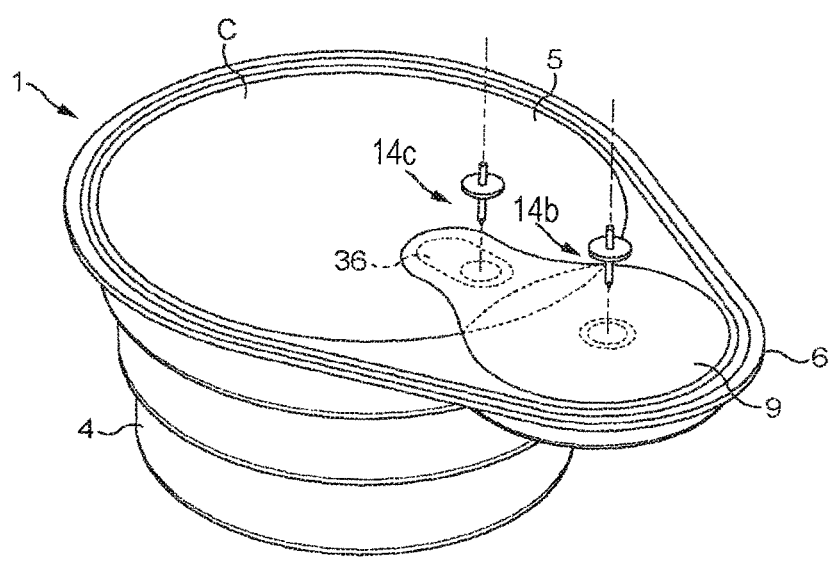

As illustrated in FIG. 1d, the filter unit 9 is sized so that its filtering surface is at most one third of the total surface of the inlet face C. Furthermore, the largest portion of filtering surface is axially offset relative to the circular section 2a of the inlet face C, when the capsule 1 is viewed in projection view along the longitudinal axial line A. By "largest portion", it is meant that at least 60%, preferably 85% of the filtering surface F is placed outside the circular section 2a in the projection along direction A. The filtering surface F is here considered as the total surface of the filter membrane minus its pinched circumference. A certain overlap of the surfaces of the circular section 2a and the bulge section 2b may be considered as acceptable. A first problem solved is the reduction of the base body 2 and the ability to better control the deformation of the filter 9. Another problem solved is about the reduction of the amount of material for the filter membrane and consequently the reduction of the manufacturing cost and the impact of the used capsule on environment. Another advantage is the possibility to compress the capsule 1, in particular, the cup-shape base body 2 of the capsule 1 after emptying for reducing the storage volume of the used capsules 1. For this, the side wall 4 may include weakened lines oriented in such as way to promote compression of the cup in the axial direction A.

In FIG. 1b, a top view of the capsule 1 along the longitudinal vertical axis A is shown. The contour of the inlet face C viewed from above has an asymmetric shape, i.e. a shape that is not symmetric in rotation around the longitudinal axis A. The asymmetric contour of the inlet face C is due to the bulge section 2b extending from the circular section 2a.

Figure 2A:
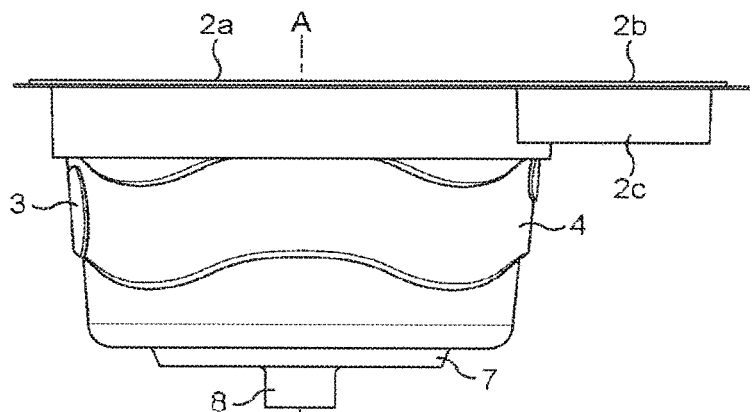
FIGS. 2a-2c show a capsule according to the present invention from different perspectives.
Figure 2B:
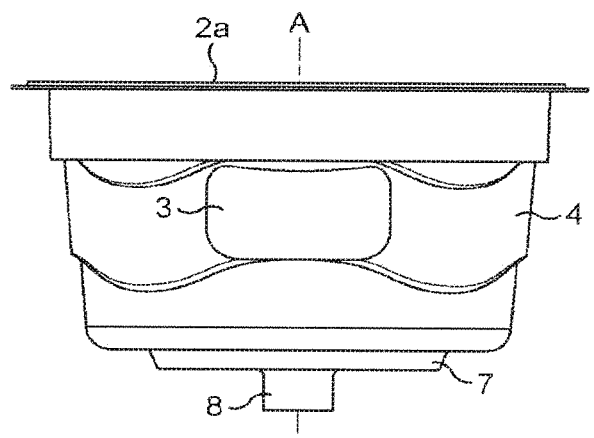
Figure 2C:
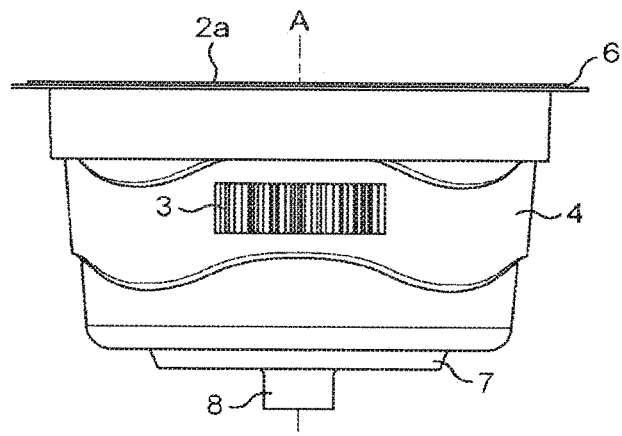

In FIGS. 2a-2c an optically readable code 3 on the side wall 4 of the capsule 1 is shown. The optically readable code 3 is preferably a bar code, which comprises a byte of n digits, which correspond preferably to a serial number of the capsule 1 (e.g. from 0 to 9999). The optically readable code 3, however, can be any other code than a bar code, which is readable by optical means. The optically readable code 3 on the capsule 1 is preferably a 1-D or 2-D barcode. Such a code is formed by a plurality of bars, dots or squares of contrast in color, for example dark bars on light background or vice versa. The code could as well be invisible to naked eyes but revealed under UV light. The optically readable code 3 does not need to be a published standard, however a standard format such as EAN 13, OPC-A, or interleaf 2 or 5 may be used.

The optically readable code 3 is preferably provided at a position, which, when viewing the capsule from the inlet face C, i.e. from the top of the capsule 1 along the longitudinal axis A, is located opposite the bulge section 2b, i.e. on the other side of the circular section 2a of the base body 2 than the side, from which the bulge section 2b extends. The bulge section 2b thus unambiguously determines the position of the optically readable code 3 on the side wall 4 of the cup-shaped base body. Although the preferred position of the optically readable code 3 in respect to the bulge section 2b is the above mentioned opposite side, it can also be positioned at other predetermined positions in respect to the bulge section 2b. For example, following the circumferential direction of the cup-shaped base body 2 in either direction until an angle of 90° is reached can be chosen as the position for the optically readable code 3. Any contour of the inlet face C, which is not symmetric in rotation, will have a distinguishing anchor point, like the bulge section 2a, in respect to which the position of the optically readable code 3 can be fixed. The contour of the inlet face C with the bulge section 2b serves as a positioning aid for the optically readable code 3, when the capsule 1 is inserted into a beverage production machine 10, so that it is ensured that the optically readable code 3 faces a certain direction inside the beverage production machine 10, preferably to be read by optical means fixed in the machine 10, as will be explained below. The bulge section 2b of the inlet face C serves a double function for the capsules 1 described above, since it can firstly be used to define the position of the optically readable code 3, and secondly serves to hold a fluid inlet unit and/or filter 9, which cleans the liquid inserted into the capsule 1 from contamination.

As can be seen in FIG. 2a-2c, the optical code 3 is positioned on the sidewall 4 of the capsule 1 between the upper flange 6 of the inlet face C and the bottom wall 7 of the cup-shaped body. To the upper flange 6, a foil member 5 can be sealed, as shown in FIG. 1c. The foil member 5 is intended to be perforated, in order to insert liquid into the capsule 1. The supplied liquid then flows through the capsule 1 and exits from the one or more outlets 8 on the bottom 7 of the cup-shaped body 2. Since the optically readable code 3 is positioned on the side wall 4, it is protected from any liquid, which might sputter or spray, when supplied to the capsule 1 through the inlet face C, i.e. the foil member 5, or when output from the capsule 1 through one or more outlets 8.

Preferably, the cup-shaped body 2 of the capsule 1 is wider (in terms of its radius around the longitudinal axis A) near the upper flange 6, than near the bottom wall 7, and wider in particular than at the position of the optically readable code 3 on the side wall 4 of the cup-shaped base body 2. Thus, liquid that might spray or sputter, when injected into the capsule 1 through the inlet face C, is hindered from soiling the optically readable code 3, because it is screened by the widened body 2 at the inlet face 6. Therefore, the optically readable code 3 will allow for a better performance of an automatic capsule detection in the beverage production machine 10. Preferably, also the one or more outlets 8 are smaller in terms of their radius or width, than the radius of the cup-shaped base body 2 at its bottom 7. The same screening effect, this time by means of the bottom 7, as described above for the inlet face C occurs, and liquid that might spray or sputter from one or more outlets 8, is prevented from hitting the optically readable code 3.

Figure 3:
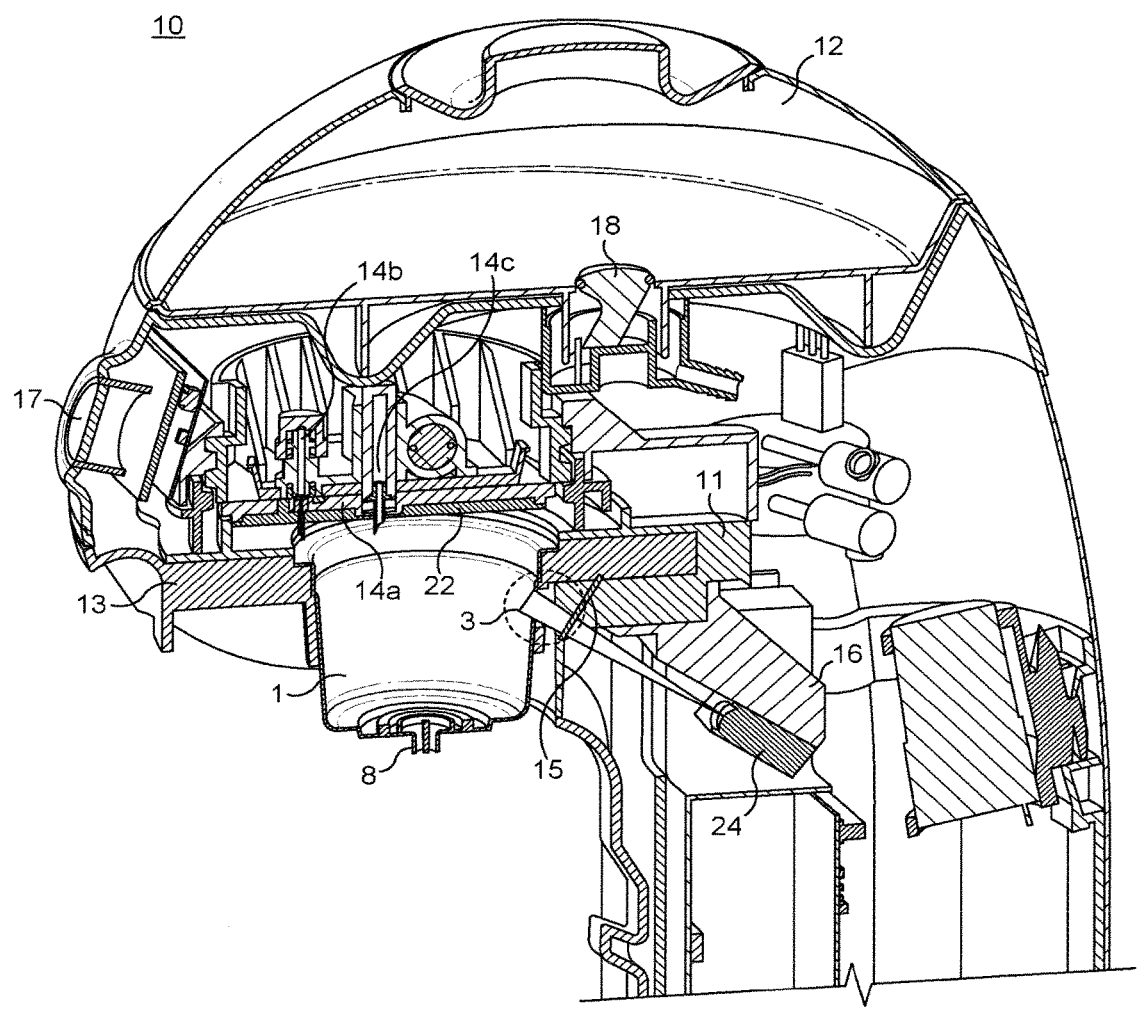
FIG. 3 shows a detailed cross-section of a head portion of a beverage production machine according to the present invention.

FIG. 3 shows a cross-section through a head portion of a beverage production machine 10 according to the present invention (i.e. the upper part of the machine without the base part of the machine 10, which typically comprises a drip tray or support for the baby bottle or the like). The beverage production machine 10 comprises housing 11, into which a capsule holder 13 can be inserted. The capsule holder 13 can be inserted preferably in a sliding arrangement. The housing 11 is therefore equipped with guiding rails for guiding the capsule holder 13 in a sliding relationship into the housing 11, and for ensuring a defined position of the capsule holder 13 in the housing 11. Further details regarding the capsule holder 13 will be provided below.

Attachable to the housing 11, as shown in the upper part of FIG. 3, is a reservoir 12, which holds liquid to be supplied to the capsule 1, in order to prepare the nutritional product. The liquid in the reservoir 12 can be any liquid like water, soup, milk or the like. Also multiple, different liquids could be held in sub-reservoirs or compartments in the reservoir 12. The reservoir 12 communicates with the housing 11 via a valve 18. The valve 18 is preferably designed to automatically open when the reservoir 12 is attached to the housing 11, and is designed to automatically close, if the reservoir 12 is removed from the housing 11. The reservoir 12 is constructed removable to the housing 11 to simplify its refilling or. The beverage production machine 10 further comprises means to heat the liquid in the reservoir 12, or to heat the liquid from the reservoir 12 in a separate chamber. The machine provides preferably liquid temperatures in a range of 23° C. to 40° C., however also other ranges for other purposes can be envisaged.

Inside the housing is arranged a liquid injection assembly, which comprises an injection plate 14a, a liquid needle 14b and optionally a gas needle 14c. The injection plate 14a is adapted to be either in an open position or in a closed position. The liquid needle 14b follows the movement of the injection plate 14a. When the injection plate 14a is closed, when the beverage production machine 10 is operated to produce a nutritional product, the liquid needle 14b is pushed through an opening 22 of the housing 11 and penetrates the capsule 1 held in the capsule holder 13 from above, i.e. perforates the wall member 5, which is preferably a foil member sealed to the upper flange 6 of the capsule 1 in a liquid tight manner. Then, liquid from the reservoir 12 can then be injected through the liquid needle 14b into the inlet face C of the capsule 1. The capsule 1 is preferably positioned inside the beverage production machine 10 so that the liquid needle 14b injects liquid in the area, for example the bulge section 2b of the inlet face C as explained above, where the filter 9 or other fluid inlet unit is positioned. Thus, the injected liquid will be automatically freed from any contamination. When the injection plate 14a is closed, a liquid tight enclosure is further obtained between the housing 11 and the capsule 1, since the liquid plate 14a presses liquid tight onto the upper flange 6 of the capsule 1. Therefore, liquid is prevented from circulating down on the outside surface of the capsule 1 to the location of the optically readable code 3, which is below the upper flange 6. All liquid that is injected by the liquid needle 14b flows through the capsule 1, no leakage occurs. Thus, the optically readable code 3 is protected from being soiled during operation of the production beverage device 10.

When the injection plate 14a is opened, the liquid needle 14b is retracted through the opening 22 following the movement of the injection plate 14a. Any residual liquid which might drip from the liquid needle 14b is collected and drained through drain channels 20 (see FIG. 5) provided on the capsule holder 13. The drain channels 20 serve to guide the liquid off the device. Therefore, liquid contamination of housing 11 can be reduced. The injection plate 14a can be opened and closed automatically, by any suitable mechanism, either mechanically or electrically. The beverage production machine 10 optionally comprises one or more pumps to feed the liquid from the reservoir 12 or from a heating chamber to the liquid injection assembly.

A code reader 24 is placed in the frame 16 of the beverage production machine 10, the frame 16 being outside the housing 11. The frame 16 is basically the part of the beverage production machine 10, which connects the head portion and the (not shown) base part. In FIG. 3 the frame 16 is oriented substantially vertical, however, the code reader 24 is provided on a slanted part of the frame 16.

The code reader 24 comprises one or more light emitting diodes, LEDs, to illuminate the optically readable code 3 of the capsule 1, which is held in the capsule holder 13. To allow the emitted light to enter the housing 11, into which the capsule holder 13 with the capsule 1 can slide, the housing 11 comprises a window 15. The window 15 prevents the code reader 24 from being contaminated by liquids seeping out from the housing 11, where the liquid injection assembly 14a, 14b is located. However, also the window 15 should not be contaminated with any liquids or vapor, since otherwise the light emitted from the light-emitting diodes of the code reader 24 cannot completely pass cleanly through to the housing 11, where the capsule 1 with the optically readable code 3 is located. Therefore, the above mentioned protection features are implemented. One feature is that drain channels 20 in the capsule holder 13 drain away residual liquid dripping from the liquid needle 14b, when the injection plate 14a is opened after an operation of the beverage production machine 10. The other is that when the injection plate 14a is closed, a liquid tight closure between the housing 11 and the capsule 1 is provided, preventing liquid to circle around the outer surface of the capsule 1 to the lower part of the housing 11, where the window 15 is situated. Additionally the walls of the capsule holder 13 will be interposed between the liquid injection plate 14a and the window 15. Thus, it is virtually impossible for liquid to drip or spurt onto the window 15, when the injection plate 14a is closed.

The window 15 is positioned in the propagation direction of the light emitted from the one or more LEDs of the code reader 24. The window is preferably made of plastic or glass. However, any other material can be chosen, as long as the material is completely transparent for the emitted light. The code reader 24 further comprises a focusing lens, which can focus the emitted light onto the optically readable code 3 on the capsule 1. Thus, an image of the optically readable code can be acquired. A charge coupled device, CCD, in the code reader 24 transforms the acquired image into an electrical signal. The control unit of the beverage production machine 10 can analyze the electrical signal, and can interpret the optically readable code 3. Further, a memory unit is provided in the beverage production machine 10, which can memorize the analysis result, i.e. can memorize the last optically readable code 3 read by the code reader 24. Preferably, the memory unit is at least large enough to memorize the last 20 read codes 3. The control unit is further able to deactivate the beverage production machine 10, if a read optically readable code 3 on a capsule 1 corresponds to one of the stored optical codes 3 in the memory unit. The control unit is able to perform an algorithm that compares the interpreted analysis result for the optically readable codes 3 with the stored results in the memory unit. As an alternative to deactivate the beverage production machine 10, the control unit can issue a warning signal to the user. Thereby, accidental multiple usage of a single capsule 1 is prevented, but a reheating of the liquid for the next preparation step of a nutritional product the liquid can also be prevented, since the machine 10 stays turned on.

The control unit is further able to set the correct preparation parameters based on the optically readable code 3, which the code reader 24 reads from the capsule. Preparation parameters can comprise the correct amount of necessary supplied liquid and/or liquid temperature which can differ for different nutritional products. It is also conceivable that the reservoir 12 holds multiple liquids in multiple sub-reservoirs or compartments, and that the control unit is able to decide, based on the read code 3, which liquid is the one to be used for a given capsule 1. Finally, the flow rate or the pressure, which is applied to the liquid, could be varied for different capsules 1, in order to achieve the best possible results. The one or more LEDs, the charged coupled device, the control unit and the memory unit are supplied with power over support circuitry, which is included in the frame 16 of the beverage production machine 10.

The window 15 is arranged in the housing 11 so that the normal direction of the window plane 15 is not parallel to the injection direction of the liquid from the liquid needle 14b, and to the direction of the liquid flowing through the capsule 1, which is preferably along the longitudinal axis A of the capsule 1. The angle between said normal direction of the window plane 15 and the flow direction of the liquid supplied by the liquid needle 14b preferably is chosen from a range of 20° to 70°, and more preferably between 40° and 50°. The window 15 is then also oriented so that its plane takes an angle B relative to the bottom plane 7 of the cup-shaped body 2 of the capsule 1, which is preferably in a range of 110° and 160°, more preferably 130° to 140° (as shown in FIG. 4b). By means of the above-described arrangement, the risk for liquid soiling the window 15 can be reduced. Thus, the reliability of the code reader 24 in the beverage production machine 10 can be increased, and the machine, in particular the window 15, is made easier to clean.

In respect to the window 15, the code reader 24 has to be aligned in a way that the light emitted from the LEDs of the code reader 24 impinges the window 15 frontally. That means the angle of the propagation direction of the emitted light and the window plane 15 should be perpendicular, so that reflections of the light on the window 15 are avoided. Reflections could keep the light form properly illuminating the optically readable code 3 on the capsule 1, and could falsify the reading. To this end, the code reader 24 is provided, as explained above, on a slanted part of the frame 16. The angle, in which the part is oriented, corresponds to the angle of the window 15 in respect to the fluid flow direction. Alternatively, mirrors could be used to reflect the light so that it properly impinges on the window 15. Additionally movable mirrors, e.g. movable from the outside by the user, can be provided, in order to compensate for any misalignment of the light beams, which could occur with time. The adjustment could also be performed automatically by the control unit, for example, if the control unit determines that optically readable codes 3 could not be read properly for a consecutive number of times above a predetermined threshold value. A warning signal could in this case be issued to the user, and/or the beverage production machine 10 could be deactivated.

The code reader 24 in the beverage production machine can also be positioned otherwise, for example not in the head portion of the machine 10, so that the light emitted by the light emitting diodes cannot directly hit onto the window 15. For example, the code reader 24 could be positioned in the base part of the machine, even further away from the liquid injection assembly, and optical communication to the window 15 can be achieved by means of mirrors and/or lenses provided inside the beverage production machine 10.

Preferably, the window 15 is positioned in the housing 11, so that the one or more outlets 8 of the capsule 1 are below the window 15, i.e. downstream of the window 15 in respect to the liquid flowing through the capsule 1. Therefore, liquid that might spray or spurt from the one or more outlets 8 of the capsule 1 is prevented from hitting the window 15, where it would block the light emitted from the one or more LEDs of the code reader 24, and would reduce the reliability of the determination of the capsule 1.

Figure 5:
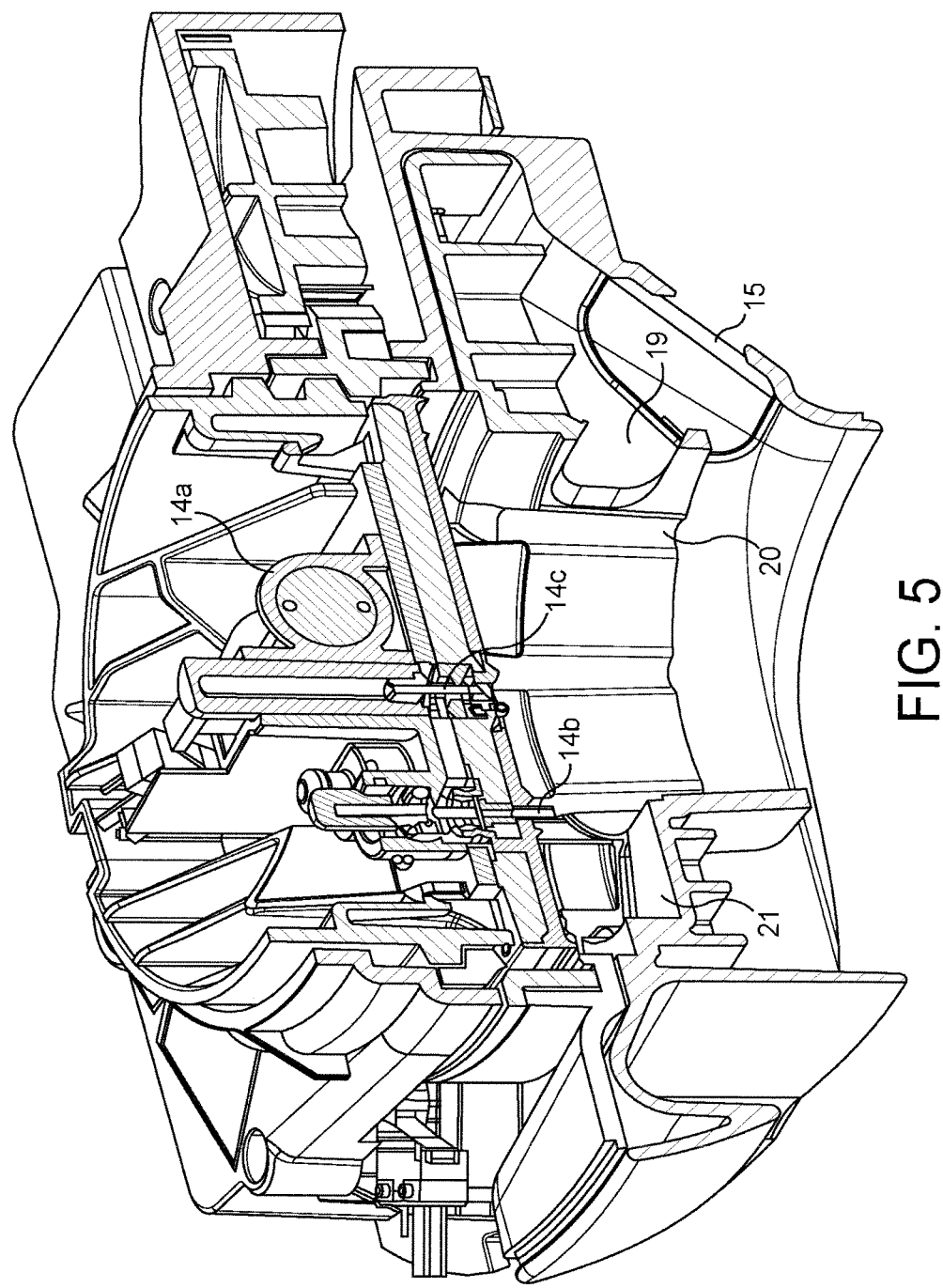
FIG. 5 shows a capsule holder of a beverage production machine according to the present invention, without an inserted capsule.

Naturally, the capsule 1 has to be prepositioned in the beverage production machine 10 in such a way that the optically readable code 3 on the capsule 1 faces the window 15, so that the code reader 24 can properly illuminate the optically readable code 3 with the emitted light from the LEDs. Since the window 15 and the code reader 24 are at a fixed position in the beverage production machine 10, it has to be ensured that the capsule 1 is always inserted in a way that the optically readable code 3 comes to be at a position in front of the window 15. This problem is solved by the present invention, since the capsule 1 can only be inserted into the capsule holder 13 in a specific (single) orientation, since the contour of the inlet face C is not symmetric in rotation a described above. As shown in FIG. 5, the capsule holder 13 is designed with a seat 21 with an upper wall and a sidewall, which matches the non-symmetric contour of at least the inlet face C, so as to guarantee that the capsule 1 is placed correctly into the capsule holder 13. The asymmetric contour of the inlet face C of the capsule 1 thus serves as a positioning aid, and thus the optically readable code 3 will automatically be positioned correctly in the beverage production machine 10.

Figure 4A:
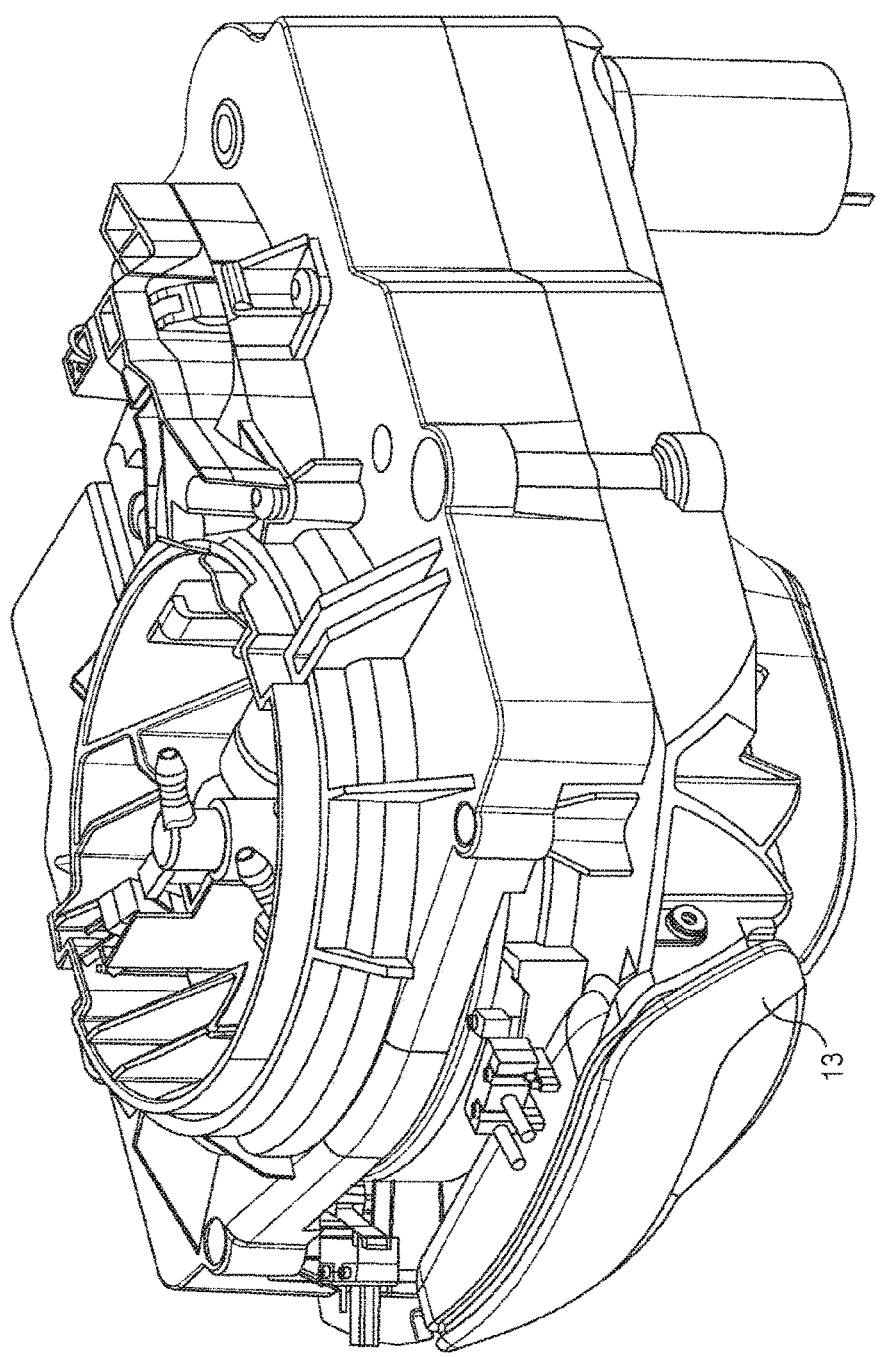
FIGS. 4a and 4b show a capsule holder positioned in a beverage production machine according to the present invention, with an inserted capsule according to the present invention.
Figure 4B:
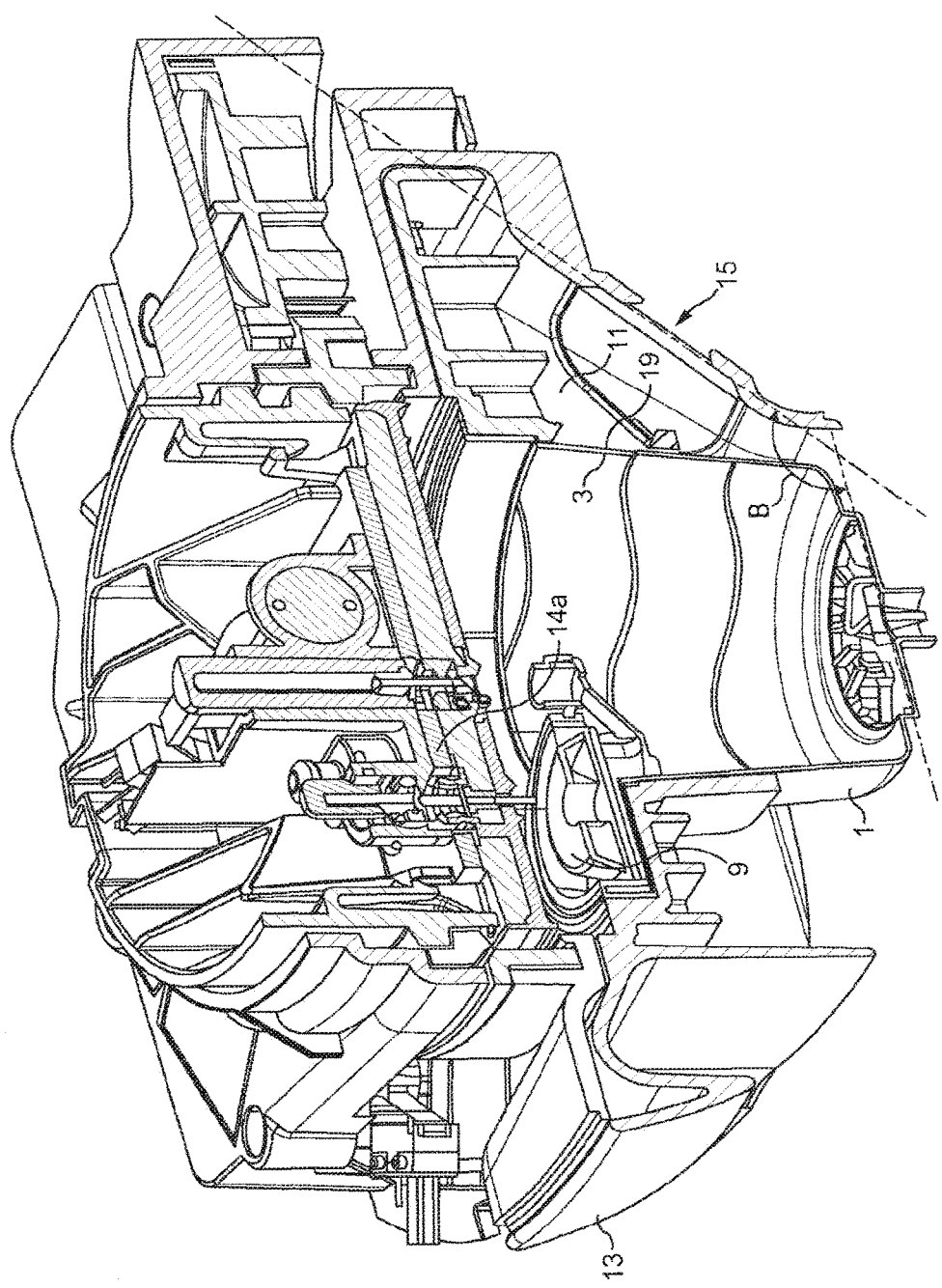

The capsule holder 13 is shown in more detail in FIGS. 4a, 4b and FIG. 5, respectively. In FIG. 4b the capsule holder 13 is shown at its position in the housing 11 of the beverage production machine 10. Also the capsule 1 with the rotational non-symmetric contour of the inlet face C is illustrated, as being placed into the capsule holder 13. It can be seen that the capsule 1 is fitted in such a way into the capsule holder 13, and the capsule holder 13 is fitted in such a way into the housing 11, that the injection plate 14a, the liquid needle 14b, and optionally the gas needle 14c come to be located above the inlet face C of the capsule, which can be covered by the foil member 5. In particular the liquid needle 14b is positioned above the circular section 2b, into which the filter 9 can be implemented. Further, the optically readable code 3 on the capsule 1 is positioned to be in front of the window 15 of the housing 11. Due to this arrangement it is impossible for the user to position the capsule 1 incorrectly in the beverage production machine 10. The code reader 24 will always be able to illuminate and consequently to read the optically readable code 3 on the capsule 1, and the control unit will be able to determine the type of the capsule 1 and thus set the appropriate parameters for the preparation of the nutritional product, or to switch-off the beverage production machine 10 and/or issue a warning signal.

FIG. 5 shows the capsule holder 13 in the beverage production machine 10 without an inserted capsule 1. The capsule holder 13 comprises an aperture 19, which is aligned with the window 15 of the housing 11, when the capsule holder 13 is inserted into the housing 11 of the machine 10. This is to provide an unhindered illumination of the optically readable code 3, if a capsule 1 is inserted into the capsule holder 13, wherein the optically readable code 3 is naturally aligned with the aperture 19. Since a transparent glass or plastic window 15 or wall is already provided in the housing 11, the aperture 19 does not necessarily have to be covered with a second transparent window or wall. Thus, fewer parts have to be cleaned. However, it is of course also possible to insert a second window or a transparent wall over the aperture 19, if additional protection for the optically readable code 3 on the capsule 1 is desired.

The capsule holder 13 may further comprise magnets for detecting the reference position of the capsule holder 13 in the housing 11, to ensure that its positioning inside the machine 10 is correct and precise. Alternatively, or in addition, optical detection of a correct insertion of the capsule holder 13 into the housing 11 can be implemented. The control unit can operate both the magnetic detection and the optical detection, and can determine, whether the capsule holder 13 is inserted correctly into the housing 11. Only in a case where the capsule holder 13 is positioned precisely, the preparation of a nutritional product will be allowed. For example, the control unit could prevent the objection plate 14a from being opened, if it determines that the capsule holder 13 is positioned correctly inside the beverage production machine.

The capsule holder 13 can further be designed in a way allowing the user to remove it from the housing 11 with a one hand operation. Therefore, the capsule holder 14 can be retracted in a sliding manner from the housing 11, and can be placed into a stable intermediate position. In this intermediate position, the capsule holder 13 is still attached to the housing 11, although it is retracted out from the housing 11 far enough that a capsule 1 can be placed into the capsule holder 13. To define the intermediate position, means for stopping the capsule holder 13 are provided. The capsule holder 13 can of course be pulled out even further from the housing 11, in order to be completely removed from the beverage production machine 10. The means for the intermediate positioning could be realized by a pair of ball plungers in the guiding rails of the housing 11. The ball plungers could cooperate with means on the capsule holder 13, such as a pair of protrusions or recesses in lateral edges of the capsule holder 13. When the capsule holder 13 is moved to the intermediate position, the ball plungers engage with these protrusions or recesses, and are adapted to stably stop the capsule holder 13. Further pulling on the capsule holder 14 will be resisted by a counter-force created by the ball plungers, but can be overcome when a sufficient pulling force is applied to the capsule holder 13.

A user interface 17 can be provided, for example, on the front of the beverage production machine 10, and can be adapted to be operated by a user, in order to activate the machine 10 and/or to adjust the temperature and/or set preparation parameters. For example, the adjustment of the temperature can be obtained by a touch screen or a rotary knob at the user interface. The temperature of the liquid in the beverage production machine is preferably adjustable in a range of about 23° C. to 40° C. The temperature can be adjusted either on an incremental basis or can be adjusted continuously. Preferably, the start function of the machine 10 is obtained by a press button or by a touch screen. A function to set the above-mentioned preparation parameters manually could be provided. This can be especially useful, if the code reader 24 does not work properly, for example due to liquid contaminating the optically readable code 3 on the capsule 1 or the window 15, despite all the protection features of the present invention.

In summary, the principal mode of the present invention presents a capsule 1 having an inlet face C, which is formed by a circular section 2a and a bulge section 2b extending from the circular section 2a giving the inlet face C a not symmetric in rotation. The capsule 1 further has an optically readable code 3 on a side wall 4 of a cup-shaped body of the capsule 1 opposite the bulge section 2b. The present invention further presents a beverage production machine with a capsule holder 13 for holding a capsule 1 in such a way in the beverage production machine 10, that the optically readable code can be read by a code reader 24. Liquid can be supplied to the capsule to produce a nutritional product. The present invention provides means to prevent the optically readable code 3 and the code reader 24, respectively, from being contaminated with liquid, vapor, dirt or the like. An automatic detection of the capsule type, and a corresponding automatic setting of preparation parameters by the beverage production machine 1 becomes possible, and is more reliable than state of the art solutions.

Figure 6:
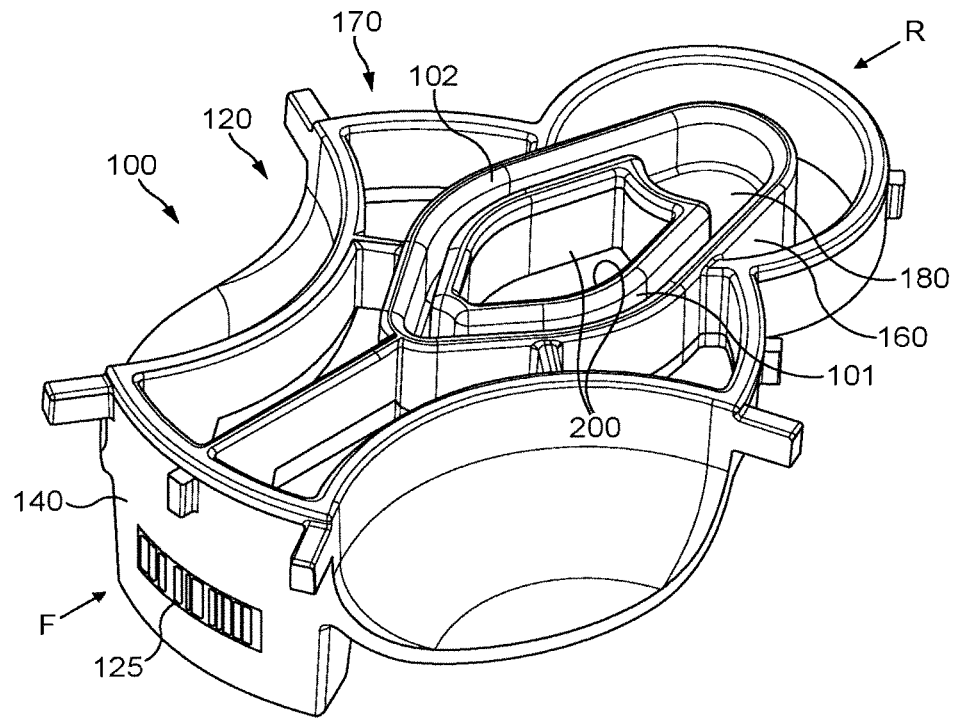
FIG. 6 shows, in front perspective view, a rinsing and/or descaling insert according to the present invention.
Figure 7:
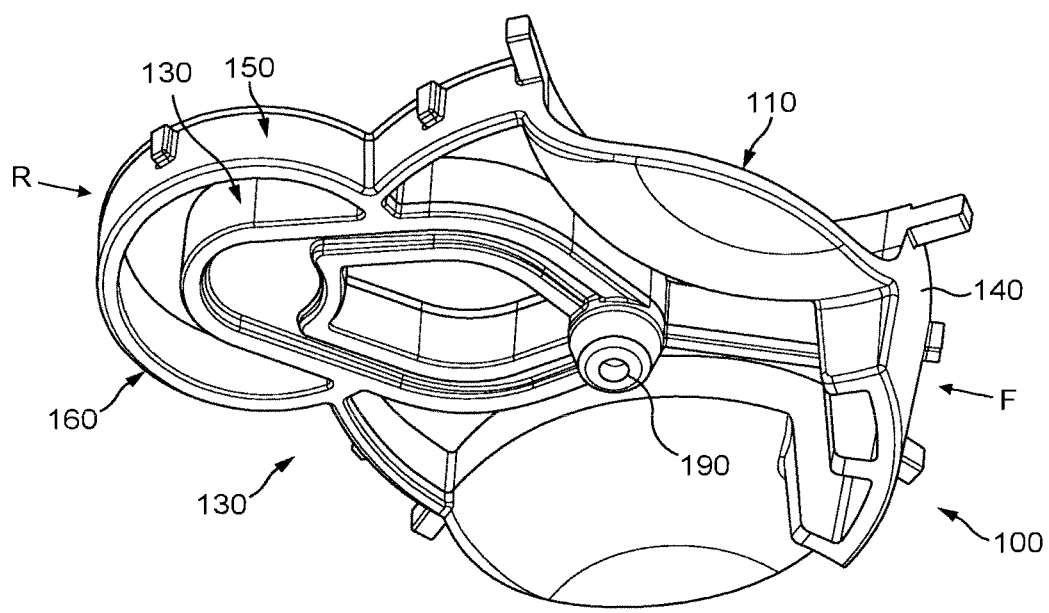
FIG. 7 shows, in bottom perspective view, the rinsing and/or descaling insert of FIG. 6.
Figure 8:
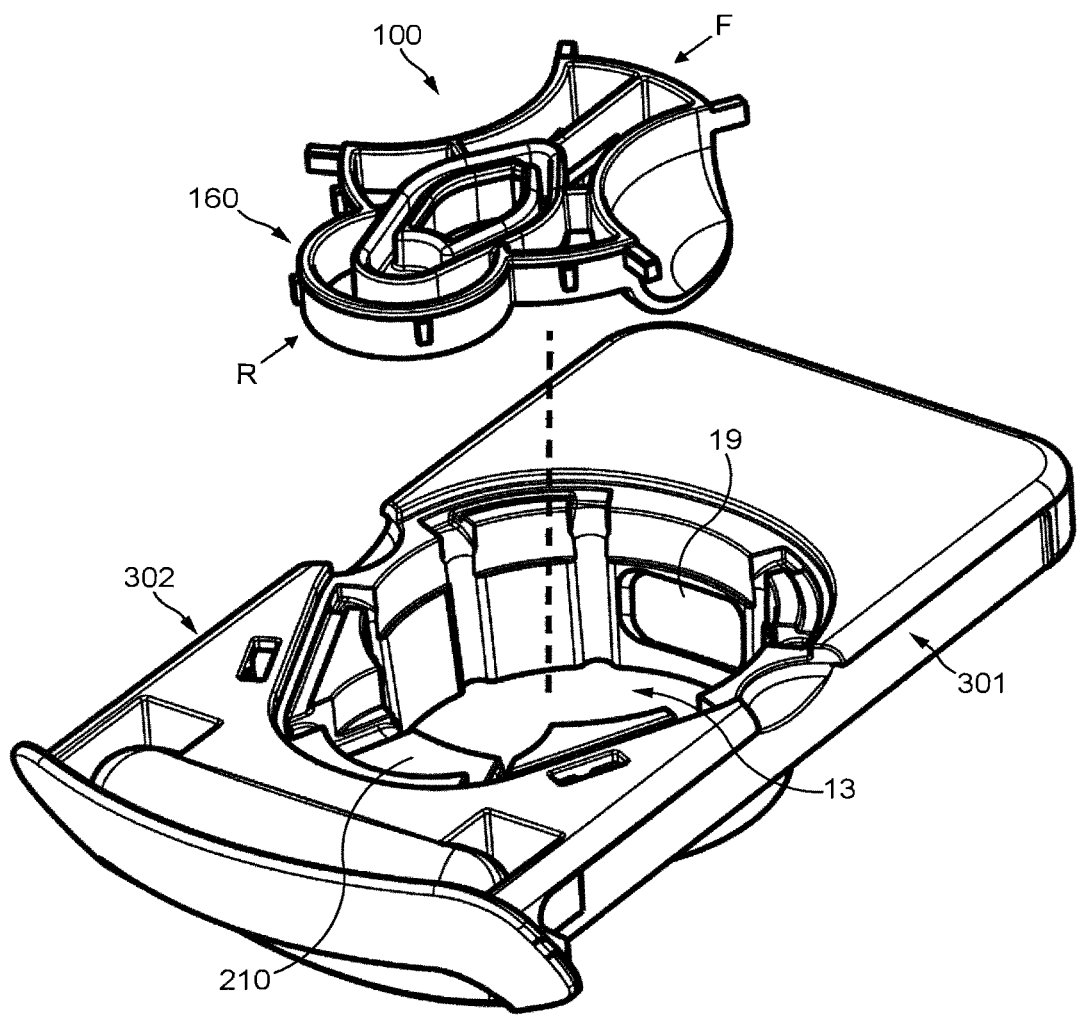
FIG. 8 shows the insert of FIG. 6 being inserted in a capsule holder of the beverage production device.

FIGS. 6 to 8 illustrate a second possible mode of the present invention. The invention relates to a removable insert 100 used for rinsing and/or descaling the beverage production machine. The insert comprises a body 110. The body comprises a fluid supply side 120, a bottom or fluid delivery side 130, a frontal sidewall 140 (also identified by arrow F) opposite to a rear side 150 (also identified by arrow R). The fluid supply side 120 presents on contour that is not symmetrical in rotation and presents a bulge section 160 extending from a main, at least partially circular, section 170. The fluid supply side 120 comprises in its bulge section 160, a liquid inlet 180. The liquid inlet communicates with a liquid outlet 190 positioned on the fluid supply side 130 through a passage. The passage may, for instance be formed of two deviation channels 101, 102. The two deviation channels bypass a gas inlet area intended for being positioned adjacent the gas inlet of the device and demarcated by a separation structure 200. When the insert is engaged by the liquid injection assembly of the beverage production machine, the open upper part of the passage or channels is closed thereby forcing injected liquid to flow transversally towards and then through the liquid outlet 190.

According to an important aspect of the invention, the frontal side of the insert has an optical readable code such as a barcode 125. The optical readable code can be printed or engraved on the wall or be supported on a label adhesively connected to the frontal wall 140. As apparent, the code is away from the liquid inlet 180 a sufficient distance that reduces the risk of the code interacting with fluid, e.g, liquid and/or gas. Furthermore, the code is placed in a different plane, which is substantially transversal to the plane of extension of the fluid supply wall thereby further protecting the code from fluid interaction. Furthermore, the insert has preferably a hollow frame structure as illustrated to further enable any residual liquid to drain before reaching the frontal wall. The code may bear data or information which is relevant to the use of the insert and/or relevant to use of other inserts such as capsules.

FIG. 8 further shows that the insert has a complementary outer shape enabling it to fit into the seat 21 of the capsule holder 13 with the bulge section 160 fitting into a bulge section 210 of seat 21. In a manner similar to the coded capsule as previously described, in engagement of the insert into the seat, the optical code of front sidewall of the insert comes in alignment with a window 19 of the capsule holder to enable the code to be readable from the reader of the device when the capsule holder is placed in the housing of the machine.

Figure 9:
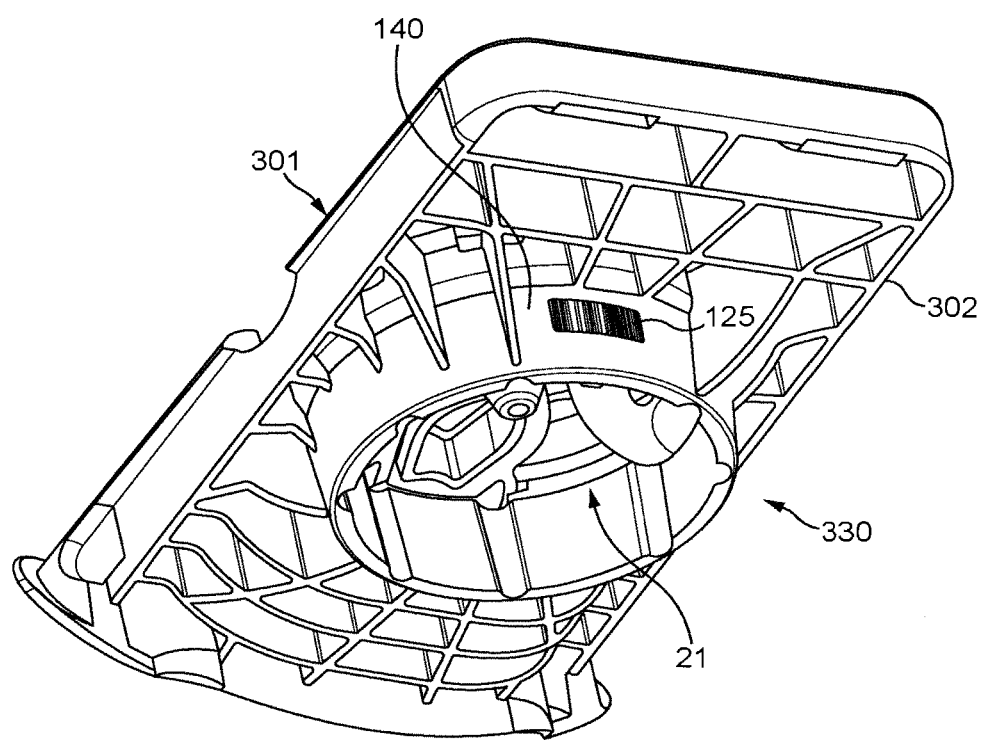
FIG. 9 shows, from bottom perspective view, a capsule holder according to the present invention.

FIG. 9 illustrates a third embodiment of the invention, in which the capsule holder 330 comprises the optical readable code thereon. The capsule holder comprises a seat 21 for receiving a capsule and guiding means such as side rails 301, 302 The seat comprises a rear sidewall and a frontal sidewall 140 forming a tubular portion, for instance (but not necessarily continuous as illustrated). An optical readable code 125 such as a barcode is applied on the frontal sidewall 140. The guiding means extend substantially transversal to the front and rear sidewalls. As previously described, the seat 21 has a bulge section in its rear area designed for receiving a bulge section of the capsule; such section being dedicated to form the fluid area of the capsule in the machine. As a result, the code 125 is away a sufficient distance from the bulge section 121 that makes the risk the code interacting with fluid, e.g., liquid and/or gas very low. Furthermore, the code is placed in a different plane, which is substantially transversal to the plane of the seat further protecting the code from fluid interaction.

The invention is claimed as follows:

1. A beverage production machine for preparing a nutritional product, the beverage production machine comprising:
   a housing;
   a reservoir for holding a liquid,
   a capsule holder removably insertable in the housing for holding a capsule containing nutritional ingredients;
   a liquid injection assembly provided in the housing for supplying the liquid held in the reservoir to the capsule held in the capsule holder; and
   an optical code reading assembly for reading an optically readable code, wherein the capsule holder is interposed, when inserted in the housing, between the liquid injection assembly and the optical code reading assembly,
   the capsule holder comprises a seat for receiving the capsule, the seat having a frontal sidewall, the seat comprises a first capsule support section and a second capsule support section extending from the first capsule support section and opposite the frontal sidewall, the second capsule support section is configured to receive a section of the capsule dedicated to forming a fluid area of the capsule in the beverage production machine, and the optically readable code is provided on the frontal sidewall of the seat of the capsule holder at a position which, when viewing the capsule holder from above, is located opposite the second capsule support section.

2. The beverage production machine of claim 1, wherein the optical code reading assembly comprises a code reader provided on a frame of the beverage production machine for reading the optically readable code, wherein the frame is located outside of the housing.

3. The beverage production machine of claim 2, wherein the housing comprises a window positioned between (i) the capsule holder inserted in the housing and (ii) the code reader, and the window is transparent to light emitted from the code reader.

4. The beverage production machine of claim 3, wherein the capsule holder comprises an aperture for uncovering an optically readable code of the capsule, the aperture being aligned with the window in the housing.

5. The beverage production machine of claim 3, wherein the window is oriented along a plane which forms an angle in a range from 110° to 160° relative to a bottom plane of the capsule in the capsule holder inserted in the housing.

6. The beverage production machine of claim 1, wherein the liquid injection assembly comprises an injection plate adapted to open and close an opening of the housing to the capsule, and the liquid injection assembly further comprises a liquid needle adapted to be extended through the opening and to inject the liquid into the capsule.

7. The beverage production machine of claim 6, wherein the capsule holder comprises drain channels configured to collect and drain the liquid from the liquid needle.

8. A beverage production machine for preparing a nutritional product from a capsule containing nutritional ingredients, the beverage production machine comprising:
   a housing;
   a reservoir for holding a liquid;
   a capsule holder removably insertable in the housing for holding a capsule containing the nutritional ingredients;
   a liquid injection assembly provided in the housing for supplying the liquid held in the reservoir to the capsule held in the capsule holder; and
   an optical code reading assembly comprising:
   a code reader for reading an optically readable code on the capsule placed in the capsule holder when the capsule holder is inserted in the housing, and
   a control unit including a memory for memorizing the optically readable code read by the code reader,
   the control unit is adapted to deactivate the beverage production machine and/or to provide a warning signal to a user of the beverage production machine when the optically readable code read by the code reader corresponds to one of last memorized optically readable codes, and the control unit is adapted to set at least one preparation parameter, for the nutritional product, according to the optically readable code of the capsule read by the code reader when the optically readable code does not correspond to the one of the last memorized optically readable codes,
   the capsule holder comprises a seat for receiving the capsule, the seat having a frontal sidewall, the seat comprises a first capsule support section and a second capsule support section extending from the first capsule support section and opposite the frontal sidewall, the second capsule support section is configured to receive a section of the capsule dedicated to forming a fluid area of the capsule in the beverage production machine, and the optically readable code is provided on the frontal sidewall of the seat of the capsule holder at a position which, when viewing the capsule holder from above, is located opposite the second capsule support section.

* * * * *